United States Patent
Burger

(10) Patent No.: US 10,169,761 B1
(45) Date of Patent: Jan. 1, 2019

(54) ADJUSTMENT OF KNOWLEDGE-BASED AUTHENTICATION

(71) Applicant: ConsumerInfo.com, Inc., Costa Mesa, CA (US)

(72) Inventor: Michael Burger, Rancho Santa Margarita, CA (US)

(73) Assignee: ConsumerInfo.com Inc., Costa Mesa, CA (US)

( * ) Notice: Subject to any disclaimer, the term of this patent is extended or adjusted under 35 U.S.C. 154(b) by 19 days.

(21) Appl. No.: 15/459,927

(22) Filed: Mar. 15, 2017

Related U.S. Application Data

(63) Continuation of application No. 14/208,595, filed on Mar. 13, 2014, now Pat. No. 9,633,322.

(60) Provisional application No. 61/790,321, filed on Mar. 15, 2013.

(51) Int. Cl.
    *G06Q 40/00* (2012.01)
    *G06Q 20/40* (2012.01)

(52) U.S. Cl.
    CPC ....... *G06Q 20/405* (2013.01); *G06Q 20/4016* (2013.01)

(58) Field of Classification Search
    USPC ...................... 705/7.11–7.42, 35, 38, 42, 44
    See application file for complete search history.

(56) References Cited

U.S. PATENT DOCUMENTS

| | | |
|---|---|---|
| 3,752,904 A | 8/1973 | Waterbury |
| 4,795,890 A | 1/1989 | Goldman |
| 4,891,503 A | 1/1990 | Jewell |
| 4,977,595 A | 12/1990 | Ohta et al. |
| 4,989,141 A | 1/1991 | Lyons et al. |
| 5,126,936 A | 6/1992 | Champion et al. |
| 5,351,293 A | 9/1994 | Michener et al. |
| 5,590,038 A | 12/1996 | Pitroda |
| 5,640,577 A | 6/1997 | Scharmer |
| 5,659,725 A | 8/1997 | Levy et al. |
| 5,659,731 A | 8/1997 | Gustafson |
| 5,715,314 A | 2/1998 | Payne et al. |
| 5,719,941 A | 2/1998 | Swift et al. |

(Continued)

FOREIGN PATENT DOCUMENTS

| | | |
|---|---|---|
| EP | 1 028 401 | 8/2000 |
| EP | 1 239 378 | 1/2002 |

(Continued)

OTHER PUBLICATIONS

Wang, et al., "User Identification Based on Finger-vein Patterns for Consumer Electronics Devices", IEEE Transactions on Consumer Electronics, vol. 56, No. 2, May 2010, pp. 799-804 (Year: 2010).*

(Continued)

*Primary Examiner* — Amber A Misiaszek
(74) *Attorney, Agent, or Firm* — Knobbe, Martens, Olson & Bear, LLP

(57) ABSTRACT

Systems and methods are provided for adjustment of difficulty level, quantity, and/or other parameters of knowledge-based authentication. The questions may be asked of a consumer based on one or more generated risk scores associated with the consumer's behavior, which may be derived from information received from the consumer, a representative responsible for entering information regarding the consumer, and/or from the consumer's computing device.

21 Claims, 11 Drawing Sheets

(56) References Cited

U.S. PATENT DOCUMENTS

| | | |
|---|---|---|
| 5,745,654 A | 4/1998 | Titan |
| 5,748,098 A | 5/1998 | Grace |
| 5,754,632 A | 5/1998 | Smith |
| 5,819,226 A | 10/1998 | Gopinathan et al. |
| 5,832,068 A | 11/1998 | Smith |
| 5,844,218 A | 12/1998 | Kawan et al. |
| 5,881,131 A | 3/1999 | Farris et al. |
| 5,884,289 A | 3/1999 | Anderson et al. |
| 5,903,830 A | 5/1999 | Joao et al. |
| 5,913,196 A | 6/1999 | Talmor et al. |
| 5,956,693 A | 9/1999 | Geerlings |
| 5,966,695 A | 10/1999 | Melchione et al. |
| 5,999,596 A | 12/1999 | Walker et al. |
| 6,021,397 A | 2/2000 | Jones et al. |
| 6,021,943 A | 2/2000 | Chastain |
| 6,026,440 A | 2/2000 | Shrader et al. |
| 6,029,154 A | 2/2000 | Pettitt |
| 6,038,551 A | 3/2000 | Barlow et al. |
| 6,069,941 A | 5/2000 | Byrd et al. |
| 6,072,894 A | 6/2000 | Payne |
| 6,073,106 A | 6/2000 | Rozen et al. |
| 6,073,140 A | 6/2000 | Morgan et al. |
| 6,085,242 A | 7/2000 | Chandra |
| 6,094,643 A | 7/2000 | Anderson et al. |
| 6,119,103 A | 9/2000 | Basch et al. |
| 6,128,602 A | 10/2000 | Northington et al. |
| 6,157,707 A | 12/2000 | Baulier et al. |
| 6,161,139 A | 12/2000 | Win et al. |
| 6,182,068 B1 | 1/2001 | Culliss |
| 6,182,229 B1 | 1/2001 | Nielsen |
| 6,196,460 B1 | 3/2001 | Shin |
| 6,233,588 B1 | 5/2001 | Marchoili et al. |
| 6,247,000 B1 | 6/2001 | Hawkins et al. |
| 6,253,202 B1 | 6/2001 | Gilmour |
| 6,254,000 B1 | 7/2001 | Degen et al. |
| 6,263,447 B1 | 7/2001 | French et al. |
| 6,269,369 B1 | 7/2001 | Robertson |
| 6,282,658 B2 | 8/2001 | French et al. |
| 6,292,795 B1 | 9/2001 | Peters et al. |
| 6,311,169 B2 | 10/2001 | Duhon |
| 6,321,339 B1 | 11/2001 | French et al. |
| 6,327,578 B1 | 12/2001 | Linehan |
| 6,330,546 B1 | 12/2001 | Gopinathan et al. |
| 6,343,279 B1 | 1/2002 | Bissonette et al. |
| 6,356,937 B1 | 3/2002 | Montville et al. |
| 6,397,212 B1 | 5/2002 | Biffar |
| 6,418,436 B1 | 7/2002 | Degen et al. |
| 6,453,353 B1 | 9/2002 | Win et al. |
| 6,457,012 B1 | 9/2002 | Jatkowski |
| 6,463,533 B1 | 10/2002 | Calamera et al. |
| 6,473,740 B2 | 10/2002 | Cockril et al. |
| 6,496,936 B1 | 12/2002 | French et al. |
| 6,510,415 B1 | 1/2003 | Talmor et al. |
| 6,513,018 B1 | 1/2003 | Culhane |
| 6,523,021 B1 | 2/2003 | Monberg et al. |
| 6,523,041 B1 | 2/2003 | Morgan et al. |
| 6,539,377 B1 | 3/2003 | Culliss |
| 6,564,210 B1 | 5/2003 | Korda et al. |
| 6,574,736 B1 | 6/2003 | Andrews |
| 6,581,059 B1 | 6/2003 | Barrett et al. |
| 6,597,775 B2 | 7/2003 | Lawyer et al. |
| 6,601,173 B1 | 7/2003 | Mohler |
| 6,607,136 B1 | 8/2003 | Atsmon et al. |
| 6,615,193 B1 | 9/2003 | Kingdon et al. |
| 6,629,245 B1 | 9/2003 | Stone et al. |
| 6,647,383 B1 | 11/2003 | August et al. |
| 6,658,393 B1 | 12/2003 | Basch et al. |
| 6,679,425 B1 | 1/2004 | Sheppard et al. |
| 6,714,918 B2 | 3/2004 | Hillmer et al. |
| 6,714,944 B1 | 3/2004 | Shapiro et al. |
| 6,725,381 B1 | 4/2004 | Smith et al. |
| 6,734,886 B1 | 5/2004 | Hagan et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,782,379 B2 | 8/2004 | Lee |
| 6,796,497 B2 | 9/2004 | Benkert et al. |
| 6,804,346 B1 | 10/2004 | Mewhinney |
| 6,805,287 B2 | 10/2004 | Bishop et al. |
| 6,816,850 B2 | 11/2004 | Culliss |
| 6,816,871 B2 | 11/2004 | Lee |
| 6,823,319 B1 | 11/2004 | Lynch et al. |
| 6,829,711 B1 | 12/2004 | Kwok et al. |
| 6,845,448 B1 | 1/2005 | Chaganti et al. |
| 6,850,606 B2 | 2/2005 | Lawyer et al. |
| 6,857,073 B2 | 2/2005 | French et al. |
| 6,871,287 B1 | 3/2005 | Ellingson |
| 6,892,307 B1 | 5/2005 | Wood et al. |
| 6,898,574 B1 | 5/2005 | Regan |
| 6,900,731 B2 | 5/2005 | Kreiner et al. |
| 6,907,408 B2 | 6/2005 | Angel |
| 6,908,030 B2 | 6/2005 | Rajasekaran et al. |
| 6,910,624 B1 | 6/2005 | Natsuno |
| 6,920,435 B2 | 7/2005 | Hoffman et al. |
| 6,928,487 B2 | 8/2005 | Eggebraaten et al. |
| 6,934,714 B2 | 8/2005 | Meinig |
| 6,934,849 B2 | 8/2005 | Kramer et al. |
| 6,934,858 B2 | 8/2005 | Woodhill |
| 6,947,989 B2 | 9/2005 | Gullotta et al. |
| 6,950,807 B2 | 9/2005 | Brock |
| 6,950,858 B2 | 9/2005 | Ogami |
| 6,965,881 B1 | 11/2005 | Brickell et al. |
| 6,968,319 B1 | 11/2005 | Remington et al. |
| 6,973,462 B2 | 12/2005 | Dattero et al. |
| 6,983,381 B2 | 1/2006 | Jerdonek |
| 6,985,887 B1 | 1/2006 | Sunstein et al. |
| 6,986,461 B1 | 1/2006 | Geoghegan et al. |
| 6,988,085 B2 | 1/2006 | Hedy |
| 6,999,941 B1 | 2/2006 | Agarwal |
| 7,016,907 B2 | 3/2006 | Boreham et al. |
| 7,028,013 B2 | 4/2006 | Saeki |
| 7,028,052 B2 | 4/2006 | Chapman et al. |
| 7,039,607 B2 | 5/2006 | Watarai et al. |
| 7,043,476 B2 | 5/2006 | Robson |
| 7,058,817 B1 | 6/2006 | Ellmore |
| 7,059,531 B2 | 6/2006 | Beenau et al. |
| 7,062,475 B1 | 6/2006 | Szabo et al. |
| 7,076,462 B1 | 7/2006 | Nelson et al. |
| 7,085,727 B2 | 8/2006 | VanOrman |
| 7,107,241 B1 | 9/2006 | Pinto |
| 7,117,172 B1 | 10/2006 | Black |
| 7,121,471 B2 | 10/2006 | Beenau et al. |
| 7,124,144 B2 | 10/2006 | Christianson et al. |
| 7,154,375 B2 | 12/2006 | Beenau et al. |
| 7,155,739 B2 | 12/2006 | Bari et al. |
| 7,174,454 B2 | 2/2007 | Roskind |
| 7,194,416 B1 | 3/2007 | Provost et al. |
| 7,200,602 B2 | 4/2007 | Jonas |
| 7,203,653 B1 | 4/2007 | McIntosh |
| 7,209,895 B2 | 4/2007 | Kundt et al. |
| 7,212,995 B2 | 5/2007 | Schulkins |
| 7,219,107 B2 | 5/2007 | Beringer |
| 7,222,369 B2 | 5/2007 | Vering et al. |
| 7,234,156 B2 | 6/2007 | French et al. |
| 7,234,160 B2 | 6/2007 | Vogel et al. |
| 7,237,267 B2 | 6/2007 | Rayes et al. |
| 7,243,369 B2 | 7/2007 | Bhat et al. |
| 7,246,067 B2 | 7/2007 | Austin et al. |
| 7,246,740 B2 | 7/2007 | Swift et al. |
| 7,249,113 B1 | 7/2007 | Continelli et al. |
| 7,263,497 B2 | 8/2007 | Wiser et al. |
| 7,263,506 B2 | 8/2007 | Lee et al. |
| 7,277,875 B2 | 10/2007 | Serrano-Morales et al. |
| 7,289,971 B1 | 10/2007 | O'Neil et al. |
| 7,303,120 B2 | 12/2007 | Beenau et al. |
| 7,310,611 B2 | 12/2007 | Shibuya et al. |
| 7,314,167 B1 | 1/2008 | Kiliccote |
| 7,328,233 B2 | 2/2008 | Salim et al. |
| 7,330,871 B2 | 2/2008 | Barber |
| 7,333,635 B2 | 2/2008 | Tsantes et al. |
| 7,340,042 B2 | 3/2008 | Cluff et al. |
| 7,340,679 B2 | 3/2008 | Botscheck et al. |
| 7,343,149 B2 | 3/2008 | Benco |

(56) References Cited

U.S. PATENT DOCUMENTS

| | | |
|---|---|---|
| 7,343,295 B2 | 3/2008 | Pomerance |
| 7,356,503 B1 | 4/2008 | Johnson et al. |
| 7,356,516 B2 | 4/2008 | Richey et al. |
| 7,370,044 B2 | 5/2008 | Mulhern et al. |
| 7,383,988 B2 | 6/2008 | Slonecker, Jr. |
| 7,386,448 B1 | 6/2008 | Poss et al. |
| 7,389,913 B2 | 6/2008 | Starrs |
| 7,403,942 B1 | 7/2008 | Bayliss |
| 7,421,732 B2 | 9/2008 | Costa-Requena et al. |
| 7,428,509 B2 | 9/2008 | Klebanoff |
| 7,433,855 B2 | 10/2008 | Gavan et al. |
| 7,433,864 B2 | 10/2008 | Malik |
| 7,437,679 B2 | 10/2008 | Uemura et al. |
| 7,438,226 B2 | 10/2008 | Helsper et al. |
| 7,444,414 B2 | 10/2008 | Foster et al. |
| 7,444,518 B1 | 10/2008 | Dharmarajan et al. |
| 7,451,113 B1 | 11/2008 | Kasower |
| 7,458,508 B1 | 12/2008 | Shao et al. |
| 7,460,857 B2 | 12/2008 | Roach, Jr. |
| 7,467,401 B2 | 12/2008 | Cicchitto |
| 7,478,157 B2 | 1/2009 | Bohrer et al. |
| 7,480,631 B1 | 1/2009 | Merced et al. |
| 7,490,356 B2 | 2/2009 | Lieblich et al. |
| 7,503,489 B2 | 3/2009 | Heffez |
| 7,509,117 B2 | 3/2009 | Yum |
| 7,509,278 B2 | 3/2009 | Jones |
| 7,512,221 B2 | 3/2009 | Toms |
| 7,519,558 B2 | 4/2009 | Ballard et al. |
| 7,529,698 B2 | 5/2009 | Joao |
| 7,530,097 B2 | 5/2009 | Casco-Arias et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,123 B2 | 6/2009 | Wade et al. |
| 7,552,467 B2 | 6/2009 | Lindsay |
| 7,555,459 B2 | 6/2009 | Dhar et al. |
| 7,562,184 B2 | 7/2009 | Henmi et al. |
| 7,562,814 B1 | 7/2009 | Shao et al. |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,584,126 B1 | 9/2009 | White |
| 7,584,146 B1 | 9/2009 | Duhon |
| 7,587,366 B2 | 9/2009 | Grim, III et al. |
| 7,587,368 B2 | 9/2009 | Felsher |
| 7,603,701 B2 | 10/2009 | Gaucas |
| 7,606,401 B2 | 10/2009 | Hoffman et al. |
| 7,606,725 B2 | 10/2009 | Robertson et al. |
| 7,610,216 B1 | 10/2009 | May et al. |
| 7,613,600 B2 | 11/2009 | Krane |
| 7,620,596 B2 | 11/2009 | Knudson et al. |
| 7,623,844 B2 | 11/2009 | Herrmann et al. |
| 7,630,932 B2 | 12/2009 | Danaher et al. |
| 7,634,737 B2 | 12/2009 | Beringer et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,688 B2 | 1/2010 | Bittner |
| 7,657,431 B2 | 2/2010 | Hayakawa |
| 7,668,769 B2 | 2/2010 | Baker et al. |
| 7,672,833 B2 | 3/2010 | Blume et al. |
| 7,685,096 B2 | 3/2010 | Margolus et al. |
| 7,685,209 B1 | 3/2010 | Norton et al. |
| 7,686,214 B2 | 3/2010 | Shao et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,271 B2 | 4/2010 | Rudkin et al. |
| 7,708,190 B2 | 5/2010 | Brandt et al. |
| 7,711,635 B2 | 5/2010 | Steele et al. |
| 7,725,385 B2 | 5/2010 | Royer et al. |
| 7,730,078 B2 | 6/2010 | Schwabe et al. |
| 7,739,139 B2 | 6/2010 | Robertson et al. |
| 7,747,494 B1 | 6/2010 | Kothari et al. |
| 7,747,520 B2 | 6/2010 | Livermore et al. |
| 7,747,521 B2 | 6/2010 | Serio |
| 7,761,379 B2 | 7/2010 | Zoldi et al. |
| 7,761,384 B2 | 7/2010 | Madhogarhia |
| 7,761,568 B1 | 7/2010 | Levi et al. |
| 7,765,166 B2 | 7/2010 | Beringer et al. |
| 7,765,311 B2 | 7/2010 | Itabashi et al. |
| 7,769,696 B2 | 8/2010 | Yoda |
| 7,769,697 B2 | 8/2010 | Fieschi et al. |
| 7,774,270 B1 | 8/2010 | MacCloskey |
| 7,778,885 B1 | 8/2010 | Semprevivo et al. |
| 7,788,040 B2 | 8/2010 | Haskell et al. |
| 7,792,715 B1 | 9/2010 | Kasower |
| 7,792,725 B2 | 9/2010 | Booraem et al. |
| 7,793,835 B1 | 9/2010 | Coggeshall et al. |
| 7,797,725 B2 | 9/2010 | Lunt et al. |
| 7,801,811 B1 | 9/2010 | Merrell et al. |
| 7,801,956 B1 | 9/2010 | Cumberbatch et al. |
| 7,802,104 B2 | 9/2010 | Dickinson |
| 7,805,362 B1 | 9/2010 | Merrell et al. |
| 7,810,036 B2 | 10/2010 | Bales et al. |
| 7,818,228 B1 | 10/2010 | Coulter |
| 7,827,115 B2 | 11/2010 | Weller et al. |
| 7,841,004 B1 | 11/2010 | Balducci et al. |
| 7,841,008 B1 | 11/2010 | Cole et al. |
| 7,844,520 B1 | 11/2010 | Franklin |
| 7,849,014 B2 | 12/2010 | Erikson |
| 7,849,624 B2 | 12/2010 | Holt et al. |
| 7,853,493 B2 | 12/2010 | DeBie et al. |
| 7,853,533 B2 | 12/2010 | Eisen |
| 7,856,494 B2 | 12/2010 | Kulkarni |
| 7,865,958 B2 | 1/2011 | Lieblich et al. |
| 7,870,078 B2 | 1/2011 | Clark et al. |
| 7,877,304 B1 | 1/2011 | Coulter |
| 7,877,784 B2 | 1/2011 | Chow et al. |
| 7,880,728 B2 | 2/2011 | de los Reyes et al. |
| 7,908,242 B1 | 3/2011 | Achanta |
| 7,909,246 B2 | 3/2011 | Hogg et al. |
| 7,912,865 B2 | 3/2011 | Akerman et al. |
| 7,930,285 B2 | 4/2011 | Abraham et al. |
| 7,941,324 B1 | 5/2011 | Sholtis |
| 7,958,046 B2 | 6/2011 | Doerner et al. |
| 7,966,192 B2 | 6/2011 | Pagliari et al. |
| 7,970,679 B2 | 6/2011 | Kasower |
| 7,975,299 B1 | 7/2011 | Balducci et al. |
| 7,979,908 B2 | 7/2011 | Millwee |
| 7,983,932 B2 | 7/2011 | Kane |
| 7,983,979 B2 | 7/2011 | Holland, IV |
| 7,991,688 B2 | 8/2011 | Phelan et al. |
| 7,991,689 B1 | 8/2011 | Brunzell et al. |
| 8,001,042 B1 | 8/2011 | Brunzell et al. |
| 8,001,153 B2 | 8/2011 | Skurtovich, Jr. et al. |
| 8,001,235 B2 | 8/2011 | Russ et al. |
| 8,011,582 B2 | 9/2011 | Ghafarzadeh |
| 8,032,932 B2 | 10/2011 | Speyer et al. |
| 8,037,097 B2 | 10/2011 | Guo et al. |
| 8,041,956 B1 | 10/2011 | White et al. |
| 8,055,904 B1 | 11/2011 | Cato et al. |
| 8,060,424 B2 | 11/2011 | Kasower |
| 8,060,916 B2 | 11/2011 | Bajaj et al. |
| 8,065,233 B2 | 11/2011 | Lee et al. |
| 8,078,453 B2 | 12/2011 | Shaw |
| 8,078,524 B2 | 12/2011 | Crawford et al. |
| 8,078,881 B1 | 12/2011 | Liu |
| 8,099,341 B2 | 1/2012 | Varghese |
| 8,104,679 B2 | 1/2012 | Brown |
| 8,127,982 B1 | 3/2012 | Casey et al. |
| 8,127,986 B1 | 3/2012 | Taylor et al. |
| 8,131,777 B2 | 3/2012 | McCullouch |
| 8,151,327 B2 | 4/2012 | Eisen |
| 8,175,889 B1 | 5/2012 | Girulat et al. |
| 8,185,747 B2 | 5/2012 | Wood et al. |

(56) References Cited

U.S. PATENT DOCUMENTS

| | | | |
|---|---|---|---|
| 8,195,549 B2 | 6/2012 | Kasower | |
| 8,214,262 B1 | 7/2012 | Semprevivo et al. | |
| 8,219,771 B2 | 7/2012 | Le Neel | |
| 8,224,723 B2 | 7/2012 | Bosch et al. | |
| 8,225,395 B2 | 7/2012 | Atwood et al. | |
| 8,229,810 B2 | 7/2012 | Butera et al. | |
| 8,234,498 B2 | 7/2012 | Britti et al. | |
| 8,239,677 B2 | 8/2012 | Colson | |
| 8,239,929 B2 | 8/2012 | Kwan et al. | |
| 8,241,369 B2 | 8/2012 | Stevens | |
| 8,244,848 B1 | 8/2012 | Narayanan et al. | |
| 8,255,452 B2 | 8/2012 | Piliouras | |
| 8,281,372 B1 | 10/2012 | Vidal | |
| 8,285,613 B1 | 10/2012 | Coulter | |
| 8,285,656 B1 | 10/2012 | Chang et al. | |
| 8,291,218 B2 | 10/2012 | Garcia et al. | |
| 8,291,477 B2 | 10/2012 | Lunt | |
| 8,302,164 B2 | 10/2012 | Lunt | |
| 8,312,033 B1 | 11/2012 | McMillan | |
| 8,315,940 B2 | 11/2012 | Winbom et al. | |
| 8,327,429 B2 | 12/2012 | Speyer et al. | |
| 8,359,278 B2 | 1/2013 | Domenikos et al. | |
| 8,364,588 B2 | 1/2013 | Celka et al. | |
| 8,374,973 B2 | 2/2013 | Herbrich et al. | |
| 8,442,886 B1 | 5/2013 | Haggerty et al. | |
| 8,443,202 B2 | 5/2013 | White et al. | |
| 8,447,016 B1 * | 5/2013 | Kugler | H04M 3/5191 379/93.23 |
| 8,456,293 B1 | 6/2013 | Trundle et al. | |
| 8,464,939 B1 | 6/2013 | Taylor et al. | |
| 8,468,090 B2 | 6/2013 | Lesandro et al. | |
| 8,478,674 B1 | 7/2013 | Kapczynski et al. | |
| 8,484,186 B1 | 7/2013 | Kapczynski et al. | |
| 8,515,828 B1 | 8/2013 | Wolf et al. | |
| 8,515,844 B2 | 8/2013 | Kasower | |
| 8,527,357 B1 | 9/2013 | Ganesan | |
| 8,527,417 B2 | 9/2013 | Telle et al. | |
| 8,527,773 B1 | 9/2013 | Metzger | |
| 8,533,118 B2 | 9/2013 | Weller et al. | |
| 8,560,381 B2 | 10/2013 | Green et al. | |
| 8,572,391 B2 | 10/2013 | Golan et al. | |
| 8,578,496 B1 | 11/2013 | Krishnappa | |
| 8,600,886 B2 | 12/2013 | Ramavarjula et al. | |
| 8,601,602 B1 | 12/2013 | Zheng | |
| 8,606,234 B2 | 12/2013 | Pei et al. | |
| 8,606,694 B2 | 12/2013 | Campbell et al. | |
| 8,630,938 B2 | 1/2014 | Cheng et al. | |
| 8,646,051 B2 | 2/2014 | Paden et al. | |
| 8,671,115 B2 | 3/2014 | Skurtovich, Jr. et al. | |
| 8,688,543 B2 | 4/2014 | Dominguez | |
| 8,701,199 B1 | 4/2014 | Dotan et al. | |
| 8,705,718 B2 | 4/2014 | Baniak et al. | |
| 8,706,599 B1 | 4/2014 | Koenig et al. | |
| 8,725,613 B1 | 5/2014 | Celka et al. | |
| 8,744,956 B1 | 6/2014 | DiChiara et al. | |
| 8,751,388 B1 | 6/2014 | Chapa | |
| 8,768,914 B2 | 7/2014 | Scriffignano et al. | |
| 8,781,953 B2 | 7/2014 | Kasower | |
| 8,781,975 B2 | 7/2014 | Bennett et al. | |
| 8,782,217 B1 | 7/2014 | Arone et al. | |
| 8,782,753 B2 | 7/2014 | Lunt | |
| 8,793,166 B2 | 7/2014 | Mizhen | |
| 8,793,777 B2 | 7/2014 | Colson | |
| 8,800,005 B2 | 8/2014 | Lunt | |
| 8,806,584 B2 | 8/2014 | Lunt | |
| 8,818,888 B1 | 8/2014 | Kapczynski et al. | |
| 8,819,793 B2 | 8/2014 | Gottschalk, Jr. | |
| 8,826,393 B2 | 9/2014 | Eisen | |
| 8,856,894 B1 * | 10/2014 | Dean | H04L 63/08 713/175 |
| 8,862,514 B2 | 10/2014 | Eisen | |
| 8,931,058 B2 | 1/2015 | DiChiara et al. | |
| 8,954,459 B1 | 2/2015 | McMillan et al. | |
| 8,972,400 B1 | 3/2015 | Kapczynski et al. | |
| 9,100,400 B2 | 8/2015 | Lunt | |
| 9,106,691 B1 | 8/2015 | Burger et al. | |
| 9,147,042 B1 | 9/2015 | Haller et al. | |
| 9,196,004 B2 | 11/2015 | Eisen | |
| 9,235,728 B2 | 1/2016 | Gottschalk, Jr. et al. | |
| 9,256,624 B2 | 2/2016 | Skurtovich, Jr. et al. | |
| 9,361,597 B2 | 6/2016 | Britton et al. | |
| 9,380,057 B2 | 6/2016 | Knauss | |
| 9,390,384 B2 | 7/2016 | Eisen | |
| 9,491,160 B2 | 11/2016 | Livesay et al. | |
| 9,600,651 B1 | 3/2017 | Ryan et al. | |
| 9,607,336 B1 | 3/2017 | Dean et al. | |
| 9,626,680 B1 | 4/2017 | Ryan et al. | |
| 9,633,322 B1 | 4/2017 | Burger | |
| 9,665,854 B1 | 5/2017 | Burger et al. | |
| 9,684,905 B1 | 6/2017 | Haller et al. | |
| 9,710,523 B2 | 7/2017 | Skurtovich, Jr. et al. | |
| 9,721,147 B1 | 8/2017 | Kapczynski | |
| 9,754,256 B2 | 9/2017 | Britton et al. | |
| 9,754,311 B2 | 9/2017 | Eisen | |
| 2001/0001877 A1 | 5/2001 | French et al. | |
| 2001/0029482 A1 | 10/2001 | Tealdi et al. | |
| 2001/0039532 A1 | 11/2001 | Coleman, Jr. et al. | |
| 2001/0042785 A1 | 11/2001 | Walker et al. | |
| 2001/0044729 A1 | 11/2001 | Pomerance | |
| 2001/0044756 A1 | 11/2001 | Watkins et al. | |
| 2001/0049274 A1 | 12/2001 | Degraeve | |
| 2002/0004736 A1 | 1/2002 | Roundtree et al. | |
| 2002/0013827 A1 | 1/2002 | Edstrom et al. | |
| 2002/0013899 A1 | 1/2002 | Faul | |
| 2002/0026519 A1 | 2/2002 | Itabashi et al. | |
| 2002/0032635 A1 | 3/2002 | Harris et al. | |
| 2002/0033846 A1 | 3/2002 | Balasubramanian et al. | |
| 2002/0035684 A1 | 3/2002 | Vogel et al. | |
| 2002/0045154 A1 | 4/2002 | Wood et al. | |
| 2002/0059201 A1 | 5/2002 | Work | |
| 2002/0059521 A1 | 5/2002 | Tasler | |
| 2002/0069122 A1 | 6/2002 | Yun et al. | |
| 2002/0077964 A1 | 6/2002 | Brody et al. | |
| 2002/0087460 A1 | 7/2002 | Hornung | |
| 2002/0091544 A1 | 7/2002 | Middeljans et al. | |
| 2002/0091635 A1 | 7/2002 | Dilip et al. | |
| 2002/0099635 A1 | 7/2002 | Guiragosian | |
| 2002/0099649 A1 | 7/2002 | Lee et al. | |
| 2002/0103933 A1 | 8/2002 | Garon et al. | |
| 2002/0111816 A1 | 8/2002 | Lortscher et al. | |
| 2002/0120537 A1 | 8/2002 | Morea et al. | |
| 2002/0120757 A1 | 8/2002 | Sutherland et al. | |
| 2002/0120846 A1 | 8/2002 | Stewart et al. | |
| 2002/0128962 A1 | 9/2002 | Kasower | |
| 2002/0133365 A1 | 9/2002 | Grey et al. | |
| 2002/0133462 A1 | 9/2002 | Shteyn | |
| 2002/0138470 A1 | 9/2002 | Zhou | |
| 2002/0143943 A1 | 10/2002 | Lee et al. | |
| 2002/0147801 A1 | 10/2002 | Gullotta et al. | |
| 2002/0157029 A1 | 10/2002 | French et al. | |
| 2002/0161711 A1 | 10/2002 | Sartor et al. | |
| 2002/0169747 A1 | 11/2002 | Chapman et al. | |
| 2002/0173994 A1 | 11/2002 | Ferguson, III | |
| 2002/0174048 A1 | 11/2002 | Dheer et al. | |
| 2002/0184509 A1 | 12/2002 | Scheidt et al. | |
| 2002/0198800 A1 | 12/2002 | Shamrakov | |
| 2002/0198806 A1 | 12/2002 | Blagg et al. | |
| 2002/0198824 A1 | 12/2002 | Cook | |
| 2003/0002671 A1 | 1/2003 | Inchalik et al. | |
| 2003/0009418 A1 | 1/2003 | Green et al. | |
| 2003/0009426 A1 | 1/2003 | Ruiz-Sanchez | |
| 2003/0023531 A1 | 1/2003 | Fergusson | |
| 2003/0036995 A1 | 2/2003 | Lazerson | |
| 2003/0046311 A1 | 3/2003 | Baidya et al. | |
| 2003/0046554 A1 | 3/2003 | Leydier et al. | |
| 2003/0048904 A1 | 3/2003 | Wang et al. | |
| 2003/0050882 A1 | 3/2003 | Degen et al. | |
| 2003/0061163 A1 | 3/2003 | Durfield | |
| 2003/0065563 A1 | 4/2003 | Elliott et al. | |
| 2003/0069839 A1 | 4/2003 | Whittington et al. | |
| 2003/0069943 A1 | 4/2003 | Bahrs et al. | |
| 2003/0078877 A1 | 4/2003 | Beirne et al. | |
| 2003/0097320 A1 | 5/2003 | Gordon | |
| 2003/0097342 A1 | 5/2003 | Whittingtom | |

(56) References Cited

U.S. PATENT DOCUMENTS

| | | |
|---|---|---|
| 2003/0097380 A1 | 5/2003 | Mulhern et al. |
| 2003/0105710 A1 | 6/2003 | Barbara et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0131102 A1 | 7/2003 | Umbreit |
| 2003/0154162 A1 | 8/2003 | Danaher et al. |
| 2003/0158751 A1 | 8/2003 | Suresh et al. |
| 2003/0158960 A1 | 8/2003 | Engberg |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0177028 A1 | 9/2003 | Cooper et al. |
| 2003/0182214 A1 | 9/2003 | Taylor |
| 2003/0187837 A1 | 10/2003 | Culliss |
| 2003/0195859 A1 | 10/2003 | Lawrence |
| 2003/0200447 A1 | 10/2003 | Sjoblom |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0220858 A1 | 11/2003 | Lam et al. |
| 2003/0225692 A1 | 12/2003 | Bosch et al. |
| 2004/0002878 A1 | 1/2004 | Hinton |
| 2004/0006488 A1 | 1/2004 | Fitall et al. |
| 2004/0010458 A1 | 1/2004 | Friedman |
| 2004/0010698 A1 | 1/2004 | Rolfe |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019549 A1 | 1/2004 | Gulbrandsen |
| 2004/0019799 A1 | 1/2004 | Vering et al. |
| 2004/0024671 A1 | 2/2004 | Freund |
| 2004/0024709 A1 | 2/2004 | Yu et al. |
| 2004/0030649 A1 | 2/2004 | Nelson et al. |
| 2004/0039586 A1 | 2/2004 | Garvey et al. |
| 2004/0044628 A1 | 3/2004 | Mathew et al. |
| 2004/0044673 A1 | 3/2004 | Brady et al. |
| 2004/0044739 A1 | 3/2004 | Ziegler |
| 2004/0054619 A1 | 3/2004 | Watson et al. |
| 2004/0064401 A1 | 4/2004 | Palaghita et al. |
| 2004/0078324 A1 | 4/2004 | Lonnberg et al. |
| 2004/0083159 A1 | 4/2004 | Crosby et al. |
| 2004/0088237 A1 | 5/2004 | Moenickheim et al. |
| 2004/0088255 A1 | 5/2004 | Zielke et al. |
| 2004/0107250 A1 | 6/2004 | Marciano |
| 2004/0110119 A1 | 6/2004 | Riconda et al. |
| 2004/0111305 A1 | 6/2004 | Gavan et al. |
| 2004/0111359 A1 | 6/2004 | Hudock |
| 2004/0111375 A1 | 6/2004 | Johnson |
| 2004/0117235 A1 | 6/2004 | Shacham |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0123162 A1 | 6/2004 | Antell et al. |
| 2004/0128150 A1 | 7/2004 | Lundegren |
| 2004/0128156 A1 | 7/2004 | Beringer et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153521 A1 | 8/2004 | Kogo |
| 2004/0158523 A1 | 8/2004 | Dort |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0177046 A1 | 9/2004 | Ogram |
| 2004/0193891 A1 | 9/2004 | Ollila |
| 2004/0199462 A1 | 10/2004 | Starrs |
| 2004/0199789 A1 | 10/2004 | Shaw et al. |
| 2004/0210661 A1 | 10/2004 | Thompson |
| 2004/0220865 A1 | 11/2004 | Lozowski et al. |
| 2004/0220918 A1 | 11/2004 | Scriffignano et al. |
| 2004/0225643 A1 | 11/2004 | Alpha et al. |
| 2004/0230448 A1 | 11/2004 | Schaich |
| 2004/0230527 A1 | 11/2004 | Hansen et al. |
| 2004/0243514 A1 | 12/2004 | Wankmueller |
| 2004/0243518 A1 | 12/2004 | Clifton et al. |
| 2004/0243588 A1 | 12/2004 | Tanner et al. |
| 2004/0243832 A1 | 12/2004 | Wilf et al. |
| 2004/0249811 A1 | 12/2004 | Shostack |
| 2004/0250085 A1 | 12/2004 | Tattan et al. |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0005168 A1 | 1/2005 | Dick |
| 2005/0010513 A1 | 1/2005 | Duckworth et al. |
| 2005/0021476 A1 | 1/2005 | Candella et al. |
| 2005/0021551 A1 | 1/2005 | Silva et al. |
| 2005/0027983 A1 | 2/2005 | Klawon |
| 2005/0027995 A1 | 2/2005 | Menschik et al. |
| 2005/0055231 A1 | 3/2005 | Lee |
| 2005/0058262 A1 | 3/2005 | Timmins et al. |
| 2005/0060332 A1 | 3/2005 | Bernstein et al. |
| 2005/0065874 A1 | 3/2005 | Lefner et al. |
| 2005/0071328 A1 | 3/2005 | Lawrence |
| 2005/0075985 A1 | 4/2005 | Cartmell |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097051 A1 | 5/2005 | Madill, Jr. et al. |
| 2005/0097320 A1 | 5/2005 | Golan et al. |
| 2005/0102180 A1 | 5/2005 | Gailey et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0119978 A1 | 6/2005 | Ates |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0138391 A1 | 6/2005 | Mandalia et al. |
| 2005/0144452 A1 | 6/2005 | Lynch et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0166262 A1 | 7/2005 | Beattie et al. |
| 2005/0171884 A1 | 8/2005 | Arnott |
| 2005/0181765 A1 | 8/2005 | Mark |
| 2005/0204041 A1 | 9/2005 | Blinn et al. |
| 2005/0208461 A1 | 9/2005 | Krebs et al. |
| 2005/0216434 A1 | 9/2005 | Haveliwala et al. |
| 2005/0216582 A1 | 9/2005 | Toomey et al. |
| 2005/0216953 A1 | 9/2005 | Ellingson |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0256809 A1 | 11/2005 | Sadri |
| 2005/0267840 A1 | 12/2005 | Holm-Blagg et al. |
| 2005/0273431 A1 | 12/2005 | Abel et al. |
| 2005/0273442 A1 | 12/2005 | Bennett et al. |
| 2005/0278542 A1 | 12/2005 | Pierson et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010072 A1 | 1/2006 | Eisen |
| 2006/0010391 A1 | 1/2006 | Uemura et al. |
| 2006/0010487 A1 | 1/2006 | Fierer et al. |
| 2006/0016107 A1 | 1/2006 | Davis |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0036870 A1 | 2/2006 | Dasari et al. |
| 2006/0041464 A1 | 2/2006 | Powers et al. |
| 2006/0041670 A1 | 2/2006 | Musseleck et al. |
| 2006/0059110 A1 | 3/2006 | Madhok et al. |

(56) References Cited

U.S. PATENT DOCUMENTS

| | | |
|---|---|---|
| 2006/0059362 A1 | 3/2006 | Paden et al. |
| 2006/0069635 A1 | 3/2006 | Ram et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0085361 A1 | 4/2006 | Hoerle et al. |
| 2006/0101508 A1 | 5/2006 | Taylor |
| 2006/0129419 A1 | 6/2006 | Flaxer et al. |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136595 A1 | 6/2006 | Satyavolu |
| 2006/0140460 A1 | 6/2006 | Coutts |
| 2006/0155573 A1 | 7/2006 | Hartunian |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0195351 A1 | 8/2006 | Bayburtian |
| 2006/0202012 A1 | 9/2006 | Grano et al. |
| 2006/0204051 A1 | 9/2006 | Holland, IV |
| 2006/0212407 A1 | 9/2006 | Lyon |
| 2006/0218407 A1 | 9/2006 | Toms |
| 2006/0229943 A1 | 10/2006 | Mathias et al. |
| 2006/0229961 A1 | 10/2006 | Lyftogt et al. |
| 2006/0235935 A1 | 10/2006 | Ng |
| 2006/0239512 A1 | 10/2006 | Petrillo |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0282429 A1 | 12/2006 | Hernandez-Sherrington et al. |
| 2006/0282660 A1 | 12/2006 | Varghese et al. |
| 2006/0282819 A1 | 12/2006 | Graham et al. |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0016522 A1 | 1/2007 | Wang |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038483 A1 | 2/2007 | Wood |
| 2007/0038568 A1 | 2/2007 | Greene et al. |
| 2007/0043577 A1 | 2/2007 | Kasower |
| 2007/0047714 A1 | 3/2007 | Baniak et al. |
| 2007/0059442 A1 | 3/2007 | Sabeta |
| 2007/0067297 A1 | 3/2007 | Kublickis |
| 2007/0072190 A1 | 3/2007 | Aggarwal |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094137 A1 | 4/2007 | Phillips et al. |
| 2007/0094230 A1 | 4/2007 | Subramaniam et al. |
| 2007/0094241 A1 | 4/2007 | Blackwell et al. |
| 2007/0106517 A1 | 5/2007 | Cluff et al. |
| 2007/0106582 A1 | 5/2007 | Baker et al. |
| 2007/0112667 A1 | 5/2007 | Rucker |
| 2007/0112668 A1 | 5/2007 | Celano et al. |
| 2007/0121843 A1 | 5/2007 | Atazky et al. |
| 2007/0124256 A1 | 5/2007 | Crooks et al. |
| 2007/0143825 A1 | 6/2007 | Goffin |
| 2007/0156692 A1 | 7/2007 | Rosewarne |
| 2007/0162307 A1 | 7/2007 | Austin et al. |
| 2007/0174186 A1 | 7/2007 | Hokland |
| 2007/0174448 A1 | 7/2007 | Ahuja et al. |
| 2007/0174903 A1 | 7/2007 | Graft |
| 2007/0192121 A1 | 8/2007 | Routson et al. |
| 2007/0192248 A1 | 8/2007 | West |
| 2007/0192853 A1 | 8/2007 | Shraim et al. |
| 2007/0198432 A1 | 8/2007 | Pitroda et al. |
| 2007/0204338 A1 | 8/2007 | Aiello et al. |
| 2007/0205266 A1 | 9/2007 | Carr et al. |
| 2007/0226093 A1 | 9/2007 | Chan et al. |
| 2007/0226122 A1 | 9/2007 | Burrell et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0250459 A1 | 10/2007 | Schwarz et al. |
| 2007/0261108 A1 | 11/2007 | Lee et al. |
| 2007/0261114 A1 | 11/2007 | Pomerantsev |
| 2007/0266439 A1 | 11/2007 | Kraft |
| 2007/0282743 A1 | 12/2007 | Lovelett |
| 2007/0288355 A1 | 12/2007 | Roland et al. |
| 2007/0288360 A1 | 12/2007 | Seeklus |
| 2007/0294195 A1 | 12/2007 | Curry et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0028446 A1 | 1/2008 | Burgoyne |
| 2008/0033742 A1 | 2/2008 | Bernasconi |
| 2008/0033956 A1 | 2/2008 | Saha et al. |
| 2008/0040610 A1 | 2/2008 | Fergusson |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059364 A1 | 3/2008 | Tidwell et al. |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086431 A1 | 4/2008 | Robinson et al. |
| 2008/0086759 A1 | 4/2008 | Colson |
| 2008/0091530 A1 | 4/2008 | Egnatios et al. |
| 2008/0103800 A1 | 5/2008 | Domenikos et al. |
| 2008/0103972 A1 | 5/2008 | Lanc |
| 2008/0104672 A1 | 5/2008 | Lunde |
| 2008/0109422 A1 | 5/2008 | Dedhia |
| 2008/0109875 A1 | 5/2008 | Kraft |
| 2008/0114670 A1 | 5/2008 | Friesen |
| 2008/0115191 A1 | 5/2008 | Kim et al. |
| 2008/0115226 A1 | 5/2008 | Welingkar et al. |
| 2008/0120569 A1 | 5/2008 | Mann et al. |
| 2008/0120716 A1 | 5/2008 | Hall et al. |
| 2008/0126233 A1 | 5/2008 | Hogan |
| 2008/0141346 A1 | 6/2008 | Kay et al. |
| 2008/0147454 A1 | 6/2008 | Walker et al. |
| 2008/0148368 A1 | 6/2008 | Zurko et al. |
| 2008/0154758 A1 | 6/2008 | Schattmaier et al. |
| 2008/0155686 A1 | 6/2008 | McNair |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0167883 A1 | 7/2008 | Khazaneh |
| 2008/0175360 A1 | 7/2008 | Schwarz et al. |
| 2008/0183480 A1 | 7/2008 | Carlson et al. |
| 2008/0183585 A1 | 7/2008 | Vianello |
| 2008/0195548 A1 | 8/2008 | Chu et al. |
| 2008/0201401 A1 | 8/2008 | Pugh et al. |
| 2008/0205655 A1 | 8/2008 | Wilkins et al. |
| 2008/0208726 A1 | 8/2008 | Tsantes et al. |
| 2008/0208735 A1 | 8/2008 | Balet et al. |
| 2008/0208752 A1 | 8/2008 | Gottlieb et al. |
| 2008/0208873 A1 | 8/2008 | Boehmer |

(56) References Cited

U.S. PATENT DOCUMENTS

| | | |
|---|---|---|
| 2008/0212845 A1 | 9/2008 | Lund |
| 2008/0216156 A1 | 9/2008 | Kosaka |
| 2008/0222706 A1 | 9/2008 | Renaud et al. |
| 2008/0229415 A1 | 9/2008 | Kapoor et al. |
| 2008/0249869 A1 | 10/2008 | Angell et al. |
| 2008/0255992 A1 | 10/2008 | Lin |
| 2008/0256613 A1 | 10/2008 | Grover |
| 2008/0263058 A1 | 10/2008 | Peden |
| 2008/0270295 A1 | 10/2008 | Lent et al. |
| 2008/0270299 A1 | 10/2008 | Peng |
| 2008/0281737 A1 | 11/2008 | Fajardo |
| 2008/0288283 A1 | 11/2008 | Baldwin, Jr. et al. |
| 2008/0288299 A1 | 11/2008 | Schultz |
| 2008/0288382 A1 | 11/2008 | Smith et al. |
| 2008/0294540 A1 | 11/2008 | Celka et al. |
| 2008/0301016 A1 | 12/2008 | Durvasula et al. |
| 2008/0306750 A1 | 12/2008 | Wunder et al. |
| 2008/0319889 A1 | 12/2008 | Hammad |
| 2009/0006230 A1 | 1/2009 | Lyda et al. |
| 2009/0018986 A1 | 1/2009 | Alcorn et al. |
| 2009/0031426 A1 | 1/2009 | Dal Lago et al. |
| 2009/0037332 A1 | 2/2009 | Cheung et al. |
| 2009/0043691 A1 | 2/2009 | Kasower |
| 2009/0044279 A1 | 2/2009 | Crawford et al. |
| 2009/0055322 A1 | 2/2009 | Bykov et al. |
| 2009/0055894 A1 | 2/2009 | Lorsch |
| 2009/0064297 A1 | 3/2009 | Selgas et al. |
| 2009/0094237 A1 | 4/2009 | Churi et al. |
| 2009/0094674 A1 | 4/2009 | Schwartz et al. |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0132347 A1 | 5/2009 | Anderson et al. |
| 2009/0138335 A1 | 5/2009 | Lieberman |
| 2009/0144166 A1 | 6/2009 | Dickelman |
| 2009/0150166 A1 | 6/2009 | Leite et al. |
| 2009/0150238 A1 | 6/2009 | Marsh et al. |
| 2009/0157564 A1 | 6/2009 | Cross |
| 2009/0157693 A1 | 6/2009 | Palahnuk |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0172788 A1 | 7/2009 | Veldula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0182653 A1 | 7/2009 | Zimiles |
| 2009/0183259 A1 | 7/2009 | Rinek et al. |
| 2009/0199264 A1 | 8/2009 | Lang |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0222308 A1 | 9/2009 | Zoldi et al. |
| 2009/0222449 A1 | 9/2009 | Hom et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0254375 A1 | 10/2009 | Martinez et al. |
| 2009/0254476 A1 | 10/2009 | Sharma et al. |
| 2009/0254572 A1 | 10/2009 | Redlich et al. |
| 2009/0254656 A1 | 10/2009 | Vignisson et al. |
| 2009/0254971 A1 | 10/2009 | Herz et al. |
| 2009/0260064 A1 | 10/2009 | Mcdowell et al. |
| 2009/0307778 A1 | 12/2009 | Mardikar |
| 2009/0313562 A1 | 12/2009 | Appleyard et al. |
| 2009/0327270 A1 | 12/2009 | Teevan et al. |
| 2009/0328173 A1 | 12/2009 | Jakobson et al. |
| 2010/0011428 A1 | 1/2010 | Atwood et al. |
| 2010/0030578 A1 | 2/2010 | Siddique et al. |
| 2010/0030677 A1 | 2/2010 | Melik-Aslanian et al. |
| 2010/0042542 A1 | 2/2010 | Rose et al. |
| 2010/0043055 A1 | 2/2010 | Baumgart |
| 2010/0049803 A1 | 2/2010 | Ogilvie et al. |
| 2010/0058404 A1 | 3/2010 | Rouse |
| 2010/0063942 A1 | 3/2010 | Arnott et al. |
| 2010/0063993 A1 | 3/2010 | Higgins et al. |
| 2010/0076836 A1 | 3/2010 | Giordano et al. |
| 2010/0077483 A1 | 3/2010 | Stolfo et al. |
| 2010/0083371 A1 | 4/2010 | Bennetts et al. |
| 2010/0088233 A1 | 4/2010 | Tattan et al. |
| 2010/0094664 A1 | 4/2010 | Bush et al. |
| 2010/0094768 A1 | 4/2010 | Miltonberger |
| 2010/0094910 A1 | 4/2010 | Bayliss |
| 2010/0100945 A1 | 4/2010 | Ozzie et al. |
| 2010/0114744 A1 | 5/2010 | Gonen |
| 2010/0114776 A1 | 5/2010 | Weller et al. |
| 2010/0121767 A1 | 5/2010 | Coulter et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0138298 A1 | 6/2010 | Fitzherald et al. |
| 2010/0145836 A1 | 6/2010 | Baker et al. |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0174638 A1* | 7/2010 | Debie .................... G06Q 40/02 705/38 |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0217837 A1 | 8/2010 | Ansari et al. |
| 2010/0223192 A1 | 9/2010 | Levine et al. |
| 2010/0229245 A1 | 9/2010 | Singhal |
| 2010/0241493 A1 | 9/2010 | Onischuk |
| 2010/0241535 A1 | 9/2010 | Nightengale et al. |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250955 A1* | 9/2010 | Trevithick .............. G06F 21/31 713/185 |
| 2010/0257102 A1 | 10/2010 | Perlman |
| 2010/0258623 A1 | 10/2010 | Beemer et al. |
| 2010/0262932 A1 | 10/2010 | Pan |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0299262 A1 | 11/2010 | Handler |
| 2010/0325442 A1 | 12/2010 | Petrone et al. |
| 2010/0325694 A1 | 12/2010 | Bhagavatula et al. |
| 2010/0332393 A1 | 12/2010 | Weller et al. |
| 2011/0004498 A1 | 1/2011 | Readshaw |
| 2011/0016533 A1 | 1/2011 | Zeigler et al. |
| 2011/0023115 A1 | 1/2011 | Wright |
| 2011/0029388 A1 | 2/2011 | Kendall et al. |
| 2011/0035788 A1 | 2/2011 | White et al. |
| 2011/0040736 A1 | 2/2011 | Kalaboukis |
| 2011/0071950 A1 | 3/2011 | Ivanovic |
| 2011/0082768 A1 | 4/2011 | Eisen |
| 2011/0083181 A1 | 4/2011 | Nazarov |
| 2011/0113084 A1 | 5/2011 | Ramnani |
| 2011/0126024 A1 | 5/2011 | Beatson et al. |
| 2011/0126275 A1 | 5/2011 | Anderson et al. |
| 2011/0131096 A1 | 6/2011 | Frew et al. |
| 2011/0131123 A1 | 6/2011 | Griffin et al. |
| 2011/0137760 A1 | 6/2011 | Rudie et al. |
| 2011/0142213 A1 | 6/2011 | Baniak et al. |
| 2011/0145899 A1 | 6/2011 | Cao et al. |

(56) References Cited

U.S. PATENT DOCUMENTS

| | | |
|---|---|---|
| 2011/0148625 A1 | 6/2011 | Velusamy |
| 2011/0161218 A1 | 6/2011 | Swift |
| 2011/0166988 A1 | 7/2011 | Coulter |
| 2011/0167011 A1 | 7/2011 | Paltenghe et al. |
| 2011/0173681 A1 | 7/2011 | Qureshi et al. |
| 2011/0179139 A1 | 7/2011 | Starkenburg et al. |
| 2011/0184780 A1 | 7/2011 | Alderson et al. |
| 2011/0184838 A1 | 7/2011 | Winters et al. |
| 2011/0196791 A1 | 8/2011 | Dominguez |
| 2011/0211445 A1 | 9/2011 | Chen |
| 2011/0260832 A1 | 10/2011 | Ross et al. |
| 2011/0264566 A1 | 10/2011 | Brown |
| 2011/0270754 A1 | 11/2011 | Kelly et al. |
| 2011/0307397 A1 | 12/2011 | Benmbarek |
| 2011/0307957 A1 | 12/2011 | Barcelo et al. |
| 2012/0011158 A1 | 1/2012 | Avner et al. |
| 2012/0016948 A1 | 1/2012 | Sinha |
| 2012/0017266 A1 | 1/2012 | DiChiara et al. |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054095 A1* | 3/2012 | Lesandro ............... G06Q 20/10 705/39 |
| 2012/0054592 A1 | 3/2012 | Jaffe et al. |
| 2012/0072382 A1 | 3/2012 | Pearson et al. |
| 2012/0078932 A1 | 3/2012 | Skurtovich, Jr. et al. |
| 2012/0084866 A1 | 4/2012 | Stolfo |
| 2012/0089438 A1 | 4/2012 | Tavares et al. |
| 2012/0108274 A1 | 5/2012 | Acebo Ruiz et al. |
| 2012/0110467 A1 | 5/2012 | Blake et al. |
| 2012/0110677 A1 | 5/2012 | Abendroth et al. |
| 2012/0124498 A1 | 5/2012 | Santoro et al. |
| 2012/0136763 A1 | 5/2012 | Megdal et al. |
| 2012/0151045 A1 | 6/2012 | Anakata et al. |
| 2012/0158574 A1 | 6/2012 | Brunzell et al. |
| 2012/0173339 A1 | 7/2012 | Flynt et al. |
| 2012/0173563 A1 | 7/2012 | Griffin et al. |
| 2012/0215682 A1 | 8/2012 | Lent et al. |
| 2012/0215719 A1 | 8/2012 | Verlander |
| 2012/0216125 A1 | 8/2012 | Pierce |
| 2012/0235897 A1 | 9/2012 | Hirota |
| 2012/0239497 A1 | 9/2012 | Nuzzi |
| 2012/0246060 A1 | 9/2012 | Conyack, Jr. et al. |
| 2012/0253852 A1 | 10/2012 | Pourfallah et al. |
| 2012/0290660 A1 | 11/2012 | Rao et al. |
| 2012/0297484 A1 | 11/2012 | Srivastava |
| 2012/0323717 A1 | 12/2012 | Kirsch |
| 2012/0331557 A1 | 12/2012 | Washington |
| 2013/0004033 A1 | 1/2013 | Trugenberger et al. |
| 2013/0006843 A1 | 1/2013 | Tralvex |
| 2013/0018811 A1 | 1/2013 | Britti et al. |
| 2013/0031109 A1 | 1/2013 | Roulson et al. |
| 2013/0031624 A1 | 1/2013 | Britti et al. |
| 2013/0041701 A1 | 2/2013 | Roth |
| 2013/0066775 A1 | 3/2013 | Milam |
| 2013/0080467 A1 | 3/2013 | Carson et al. |
| 2013/0085804 A1 | 4/2013 | Leff et al. |
| 2013/0110678 A1 | 5/2013 | Vigier et al. |
| 2013/0117087 A1 | 5/2013 | Coppinger |
| 2013/0125010 A1 | 5/2013 | Strandell |
| 2013/0132151 A1 | 5/2013 | Stibel et al. |
| 2013/0173449 A1 | 7/2013 | Ng et al. |
| 2013/0173450 A1 | 7/2013 | Celka et al. |
| 2013/0179955 A1 | 7/2013 | Bekker et al. |
| 2013/0198525 A1 | 8/2013 | Spies et al. |
| 2013/0205135 A1 | 8/2013 | Lutz |
| 2013/0246528 A1* | 9/2013 | Ogura ............... H04L 67/2814 709/204 |
| 2013/0254096 A1 | 9/2013 | Serio et al. |
| 2013/0271272 A1 | 10/2013 | Dhesi et al. |
| 2013/0279676 A1 | 10/2013 | Baniak et al. |
| 2013/0290097 A1 | 10/2013 | Balestrieri et al. |
| 2013/0293363 A1 | 11/2013 | Plymouth |
| 2013/0298238 A1 | 11/2013 | Shah et al. |
| 2013/0332342 A1 | 12/2013 | Kasower |
| 2013/0339217 A1 | 12/2013 | Breslow et al. |
| 2013/0339249 A1 | 12/2013 | Weller et al. |
| 2014/0012733 A1 | 1/2014 | Vidal |
| 2014/0025475 A1 | 1/2014 | Burke |
| 2014/0032723 A1 | 1/2014 | Nema |
| 2014/0046872 A1 | 2/2014 | Arnott et al. |
| 2014/0051464 A1 | 2/2014 | Ryan et al. |
| 2014/0061302 A1 | 3/2014 | Hammad |
| 2014/0089167 A1 | 3/2014 | Kasower |
| 2014/0110477 A1 | 4/2014 | Hammad |
| 2014/0164112 A1 | 6/2014 | Kala |
| 2014/0164398 A1 | 6/2014 | Smith et al. |
| 2014/0164519 A1 | 6/2014 | Shah |
| 2014/0201100 A1 | 7/2014 | Rellas et al. |
| 2014/0258083 A1 | 9/2014 | Achanta et al. |
| 2014/0279467 A1 | 9/2014 | Chapa et al. |
| 2014/0280945 A1 | 9/2014 | Lunt |
| 2014/0283123 A1 | 9/2014 | Lonstein et al. |
| 2014/0289812 A1 | 9/2014 | Wang et al. |
| 2014/0298485 A1 | 10/2014 | Gardner |
| 2014/0317023 A1 | 10/2014 | Kim |
| 2014/0331282 A1 | 11/2014 | Tkachev |
| 2014/0379600 A1 | 12/2014 | Chapa et al. |
| 2015/0249655 A1 | 9/2015 | Lunt |
| 2015/0326580 A1 | 11/2015 | McMillan et al. |
| 2016/0275476 A1 | 9/2016 | Artman et al. |
| 2017/0186012 A1 | 6/2017 | McNeal |
| 2017/0200223 A1 | 7/2017 | Kasower |
| 2018/0046856 A1 | 2/2018 | Kapczynski |

FOREIGN PATENT DOCUMENTS

| | | |
|---|---|---|
| EP | 1 301 887 | 4/2003 |
| EP | 1 850 278 | 10/2007 |
| EP | 2 074 513 | 2/2016 |
| GB | 2 392 748 | 3/2004 |
| JP | 2005-208945 | 8/2005 |
| KR | 10-2000-0063313 | 11/2000 |
| KR | 10-2002-0039203 | 5/2002 |
| KR | 10-2007-0081504 | 8/2007 |
| WO | WO 99/060481 | 11/1999 |
| WO | WO 00/030045 | 5/2000 |
| WO | WO 01/009752 | 2/2001 |
| WO | WO 01/009792 | 2/2001 |
| WO | WO 01/084281 | 11/2001 |
| WO | WO 02/027610 | 4/2002 |
| WO | WO 02/029636 | 4/2002 |
| WO | WO 03/071388 | 8/2003 |
| WO | WO 2004/031986 | 4/2004 |
| WO | WO 2004/046882 | 6/2004 |
| WO | WO 2005/033979 | 4/2005 |
| WO | WO 2006/019752 | 2/2006 |
| WO | WO 2006/050278 | 5/2006 |
| WO | WO 2006/069199 | 6/2006 |
| WO | WO 2006/099081 | 9/2006 |
| WO | WO 2007/001394 | 1/2007 |
| WO | WO 2007/050156 | 5/2007 |
| WO | WO 2008/042614 | 4/2008 |
| WO | WO 2008/147918 | 12/2008 |
| WO | WO 2009/064694 | 5/2009 |
| WO | WO 2009/102391 | 8/2009 |
| WO | WO 2009/117468 | 9/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |
| WO | WO 2015/038520 | 3/2015 |

OTHER PUBLICATIONS

U.S. Appl. No. 14/208,595, Adjustment of Knowledge-Based Authentication, filed Mar. 17, 2014.
U.S. Appl. No. 12/705,489, filed Feb. 12, 2010, Bargoli et al.
U.S. Appl. No. 12/705,511, filed Feb. 12, 2010, Bargoli et al.
Actuate, "Delivering Enterprise Information for Corporate Portals", White Paper, 2004, pp. 1-7.

(56) References Cited

OTHER PUBLICATIONS

"Aggregate and Analyze Social Media Content: Gain Faster and Broader Insight to Market Sentiment," SAP Partner, Mantis Technology Group, Apr. 2011, pp. 4.
Aharony et al., "Social Area Networks: Data Networking of the People, by the People, for the People," 2009 International Conference on Computational Science and Engineering, May 2009, pp. 1148-1155.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
ABC News Now:Money Matters, as broadcasted Nov. 15, 2005 with guest Todd Davis (CEO of Lifelock), pp. 6.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
Buxfer, http://www.buxfer.com/ printed Feb. 5, 2014 in 1 page.
Check, http://check.me/ printed Feb. 5, 2014 in 3 pages.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
"Consumers Gain Immediate and Full Access to Credit Score Used by Majority of U.S. Lenders", PR Newswire, ProQuest Copy, Mar. 19, 2001, p. 1.
Cowie, Norman, "Warning Bells & 'The Bust-Out'", Business Credit, Jul. 1, 2000, pp. 5.
"CreditCheck Monitoring Services," Dec. 11, 2000, pp. 1, lines 21-23.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
Day, Jo and Kevin; "ID-ology: A Planner's Guide to Identity Theft"; Journal of Financial Planning:Tech Talk; pp. 36-38; Sep. 2004.
eFunds Corporation, "Data & Decisioning: Debit Report" printed Apr. 1, 2007, http://www.efunds.com/web/industry-solutions/financial-services/frm-debit-report/htm in 1 page.
Equifax; "Equifax Credit Watch"; https://www.econsumer.equifax.co.uk/consumer/uk/sitepage.ehtml, dated Jun. 27, 2007 on www.archive.org.
Ettorre, "Paul Kahn on Exceptional Marketing," Management Review, vol. 83, No. 11, Nov. 1994, pp. 48-51.
Facebook, "Facebook helps you connect and share with the people in your life," www.facebook.com printed Nov. 16, 2010 in 1 page.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fall 1981, vol. 19, No. 3, p. 319.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gordon et al., "Identity Fraud: A Critical National and Global Threat," LexisNexis, Oct. 28, 2003, pp. 1-48.
Harrington et al., "iOS 4 in Action", Chapter 17, Local and Push Notification Services, Manning Publications Co., Jun. 2011, pp. 347-353.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
Ideon, Credit-Card Registry that Bellyflopped this Year, Is Drawing some Bottom-Fishers, The Wall Street Journal, Aug. 21, 1995, pp. C2.
"Industry News, New Technology Identifies Mortgage Fraud: Basepoint Analytics Launches FraudMark", Inman News, American Land Title Association, Oct. 5, 2005, pp. 1.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Jacob et al., A Case Study of Checking Account Inquiries and Closures in Chicago, The Center for Financial Services Innovation, Nov. 2006.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

(56) References Cited

OTHER PUBLICATIONS

Lee, W.A.; "Experian, on Deal Hunt, Nets Identity Theft Insurer", American Banker: The Financial Services Daily, Jun. 4, 2003, New York, NY, 1 page.

Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.

Letter to Donald A. Robert from Carolyn B. Maloney, dated Oct. 31, 2007, pp. 2.

Letter to Donald A. Robert from Senator Charles E. Schumer, dated Oct. 11, 2007, pp. 2.

Letter to Harry C. Gambill from Carolyn B. Maloney, dated Oct. 31, 2007, pp. 2.

Letter to Harry C. Gambill from Senator Charles E. Schumer, dated Oct. 11, 2007, pp. 2.

Letter to Richard F. Smith from Carolyn B. Maloney, dated Oct. 31, 2007, pp. 2.

Letter to Richard F. Smith from Senator Charles E. Schumer, dated Oct. 11, 2007, pp. 2.

Li et al., "Automatic Verbal Information Verification for User Authentication", IEEE Transactions on Speech and Audio Processing, vol. 8, No. 5, Sep. 2000, pp. 585-596.

LifeLock, "How LifeLock Works," http://www.lifelock.com/lifelock-for-people printed Mar. 14, 2008 in 1 page.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.

LifeLock, Various Pages, www.lifelock.com/, 2007.

Lobo, Jude, "MySAP.com Enterprise Portal Cookbook," SAP Technical Delivery, Feb. 2002, vol. 1, pp. 1-13.

Magid, Lawrence, J., Business Tools: When Selecting an ASP Ensure Data Mobility, Los Angeles Times, Los Angeles, CA, Feb. 26, 2001, vol. C, Issue 4, pp. 3.

Manilla, http://www.manilla.com/how-it-works/ printed Feb. 5, 2014 in 1 page.

Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.

Micarelli et al., "Personalized Search on the World Wide Web," The Adaptive Web, LNCS 4321, 2007, pp. 195-230.

Microsoft, "Expand the Reach of Your Business," Microsoft Business Solutions, 2004, in 16 pages.

Mint.com, http://www.mint.com/how-it-works/ printed Feb. 5, 2013 in 2 pages.

Mvelopes, http://www.mvelopes.com/ printed Feb. 5, 2014 in 2 pages.

My Call Credit http://www.mycallcredit.com/products.asp?product=ALR dated Dec. 10, 2005 on www.archive.org.

My Call Credit http://www.mycallcredit.com/rewrite.asp?display=faq dated Dec. 10, 2005 on www.archive.org.

My ID Alerts, "Why ID Alerts" http://www.myidalerts.com/why-id-alerts.jsps printed Apr. 3, 2012 in 2 pages.

My ID Alerts, "How it Works" http://www.myidalerts.com/how-it-works.jsps printed Apr. 3, 2012 in 3 pages.

"Name Availability Records", Westlaw Database Directory, http://directoy.westlaw.com/scope/default.asp?db=NA-ALL&RS=W...&VR=2.0 as printed Dec. 17, 2009, pp. 5.

National Alert Registry Launches RegisteredOffendersList.org to Provide Information on Registered Sex Offenders, May 16, 2005, pp. 2, http://www.prweb.com/printer/240437.htm accessed on Oct. 18, 2011.

National Alert Registry Offers Free Child Safety "Safe From Harm" DVD and Child Identification Kit, Oct. 24, 2006. pp. 2, http://www.prleap.com/pr/53170 accessed on Oct. 18, 2011.

National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.

Next Card: About Us, http://web.cba.neu.edu/~awatson/NextCardCase/NextCardAboutUs.htm printed Oct. 23, 2009 in 10 pages.

Ogg, Erica "Apple Cracks Down on UDID Use", http://gigaom.com/apple/apple-cracks-down-on-udid-use/ printed Nov. 5, 2012 in 5 Pages.

Pagano, et al., "Information Sharing in Credit Markets," Dec. 1993, The Journal of Finance, vol. 48, No. 5, pp. 1693-1718.

Partnoy, Frank, Rethinking Regulation of Credit Rating Agencies: An Institutional Investor Perspective, Council of Institutional Investors, Apr. 2009, pp. 21.

Paustian, Chuck, "Every Cardholder a King Customers get the Full Treatment at Issuers' Web Sites," Card Marketing, New York, Mar. 2001, vol. 5, No. 3, pp. 4.

People Finders, http://www.peoplefinders.com/?CMP=Google&utm_source=google&utm_medium=cpc printed Nov. 16, 2010 in 1 page.

People Lookup, "Your Source for Locating Anyone!" www.peoplelookup.com/people-search.html printed Nov. 16, 2010 in 1 page.

People Search, "The Leading Premium People Search Site on the Web," http://www.peoplesearch.com printed Nov. 16, 2010 in 2 pages.

PersonalCapital.com, http://www.personalcapital.com/how-it-works printed Feb. 5, 2014 in 5 pages.

Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.

Privacy Rights Clearinghouse, "Identity Theft: What to do if it Happens to You," http://web.archive.org/web/19990218180542/http://privacyrights.org/fs/fs17a.htm printed Feb. 18, 1999.

Ramaswamy, Vinita M., Identity-Theft Toolkit, The CPA Journal, Oct. 1, 2006, vol. 76, Issue 10, pp. 66-70.

Rawe, Julie; "Identity Thieves", Time Bonus Section, Inside Business, Feb. 2002, pp. 2.

Roth, Andrew, "CheckFree to Introduce E-Mail Billing Serving," American Banker, New York, Mar. 13, 2001, vol. 166, No. 49, pp. 3.

SAS, "SAS® Information Delivery Portal", Fact Sheet, 2008, in 4 pages.

Scholastic Inc.:Parent's Request for Information http://web.archive.org/web/20070210091055/http://www.scholastic.com/inforequest/index.htm as archived Feb. 10, 2007 in 1 page.

Scholastic Inc.:Privacy Policy http://web.archive.org/web/20070127214753/http://www.scholastic.com/privacy.htm as archived Jan. 27, 2007 in 3 pages.

Singletary, Michelle, "The Littlest Victims of ID Theft", The Washington Post, The Color of Money, Oct. 4, 2007.

Sumner, Anthony, "Tackling The Issue of Bust-Out Fraud", Retail Banker International, Jul. 24, 2007, pp. 4.

Sun, Hung-Min, "An Efficient Remote Use Authentication Scheme Using Smart Cards", IEEE Transactions on Consumer Electronics, Nov. 2000, vol. 46, No. 4, pp. 958-961.

"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.

Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.

US Legal, Description, http://www.uslegalforms.com/us/US-00708-LTR.htm printed Sep. 4, 2007 in 2 pages.

Vamosi, Robert, "How to Handle ID Fraud's Youngest Victims," Nov. 21, 2008, http://news.cnet.com/8301-10789_3-10105303-57.html.

(56) References Cited

OTHER PUBLICATIONS

Waggoner, Darren J., "Having a Global Identity Crisis," Collections & Credit Risk, Aug. 2001, vol. vol. 6, No. 8, pp. 6.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
International Search Report and Written Opinion for Application No. PCT/US2007/06070, dated Nov. 10, 2008.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
LeFebvre et al., "A Robust Soft Hash Algorithm for Digital Image Signature", International Conference on Image Processing 2:11 (ICIP), vol. 3, Oct. 2003, pp. 495-498.
Securities and Futures Commission, "Guideline on Anti-Money Laundering and Counter-Terrorist Financing", Jul. 2012, pp. 135.
Target, "Free Credit Monitoring and Identity Theft Protection with Experian's ProtectMyID Now Available", Jan. 13, 2014, pp. 2. http://corporate.target.com.
WhatIs.com, "Risk-Based Authentication (RBA)", https://web.archive.org/web/20121025033106/http://whatis.techtarget.com/definition/risk-based-authentication-RBA, Oct. 23, 2012, pp. 1.

\* cited by examiner

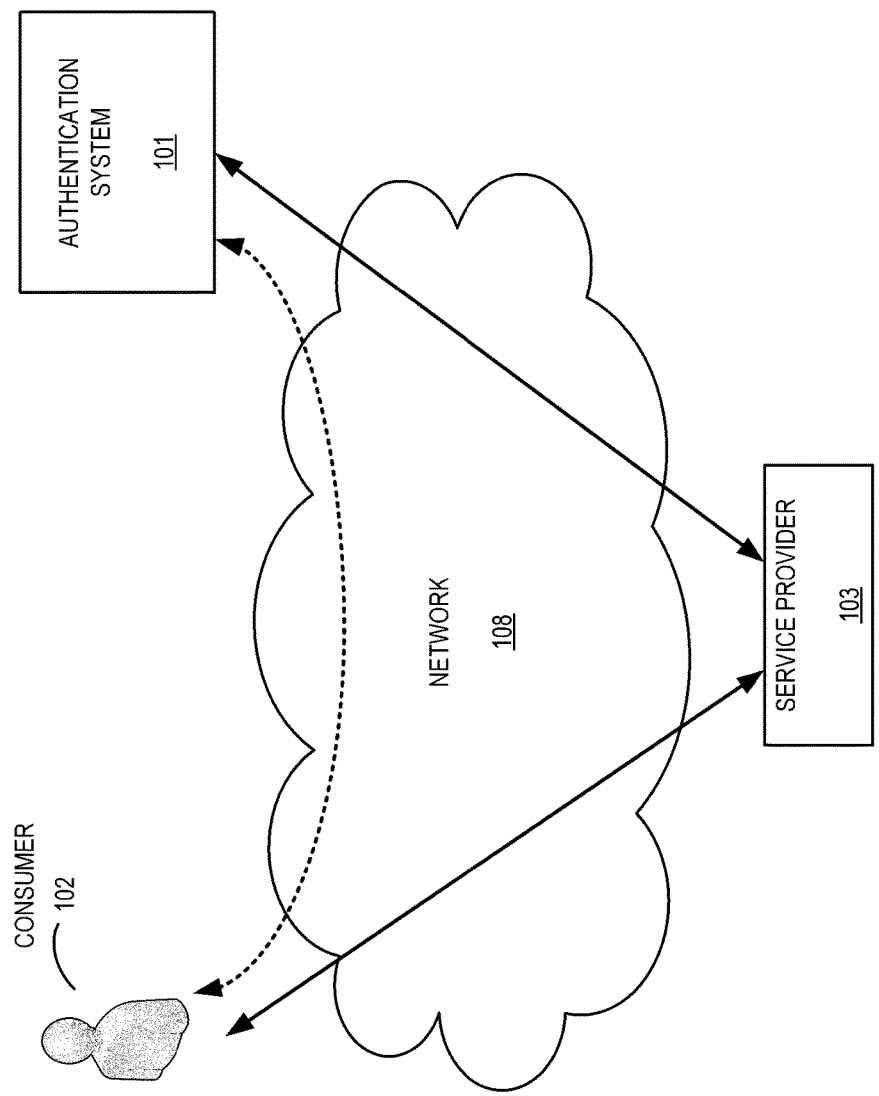

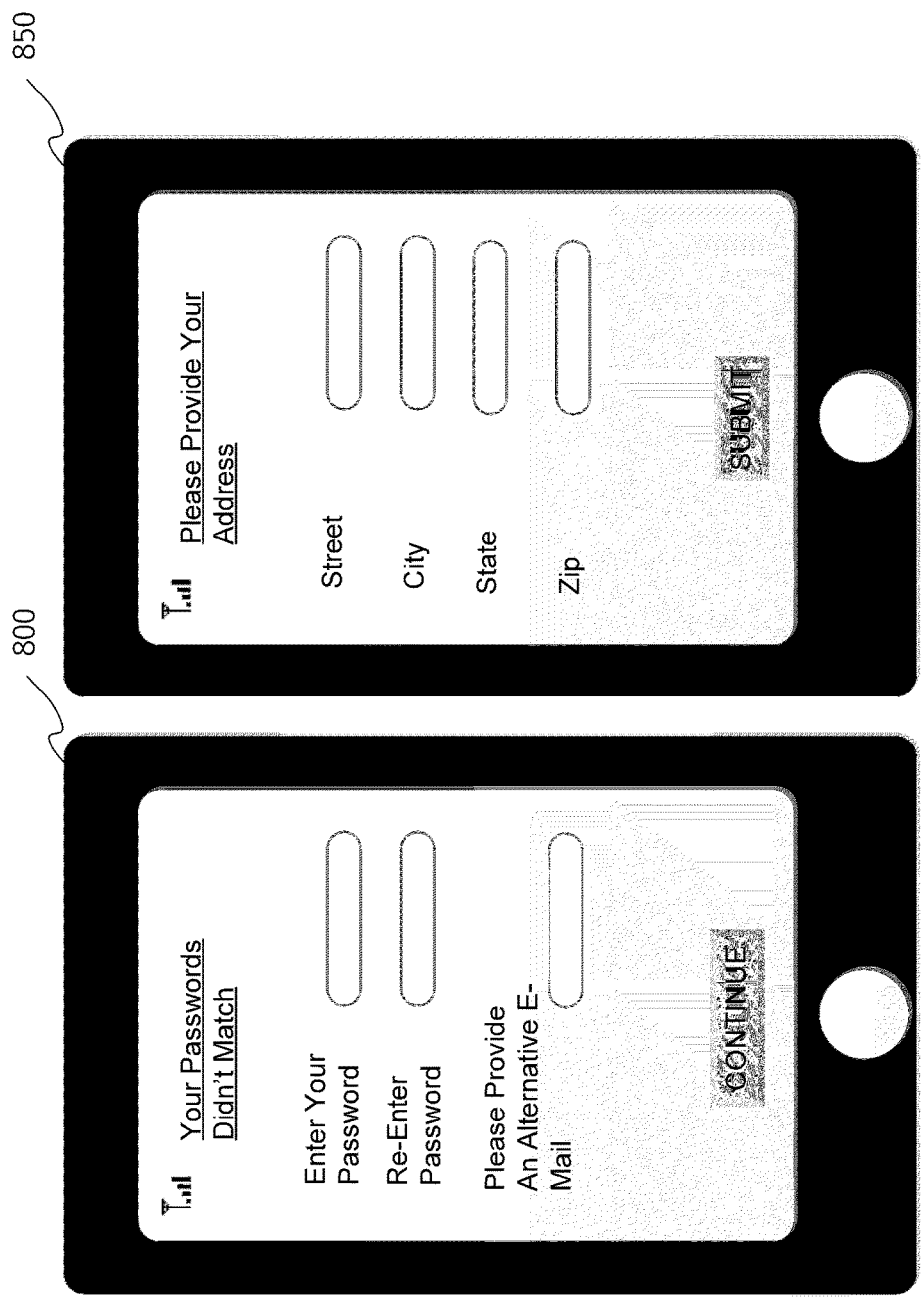

US 10,169,761 B1

ADJUSTMENT OF KNOWLEDGE-BASED AUTHENTICATION

CROSS-REFERENCE TO RELATED APPLICATIONS

This application is a continuation of U.S. application Ser. No. 14/208,595, filed on Mar. 13, 2014, which claims the benefit of priority under 35 U.S.C. § 119(e) of U.S. Provisional Application No. 61/790,321, filed Mar. 15, 2013, the disclosures of which are hereby incorporated by reference in their entireties.

BACKGROUND

Consumers requesting a new account or enrollment for a new service or product may need to be authenticated. Authentication may involve generating and presenting questions to consumers regarding identity.

SUMMARY

Disclosed herein are systems and methods for setting authentication requirements for a consumer. In one embodiment, a computing system comprises: one or more computer processors and a computer readable storage configured to store instructions executable by the one or more computer processors in order to cause the computing system to: receive a request to set authentication requirements for a consumer in response to a request from the consumer to open a new account, wherein an identity of the consumer is unknown to operators of the computing system; determine device identification information associated with a device from which opening of the new account was requested by the consumer, the device identification information comprising one or more of device ID, device location, browser time zone, browser language settings, proxy settings, stated IP address, or real IP address; derive one or more behaviors of the consumer based on at least the device identification information, the one or more behaviors comprising one or more of a frequency of authentication requests for the consumer, total amount of time taken by the consumer to answer authentication questions, or whether the device location matches a location indicated by a browser executing on the device; calculate a risk of fraud associated with the consumer based on the one or more derived behaviors of the consumer; and determine authentication requirements for the consumer based on the calculated risk of fraud, wherein the authentication requirements indicate one or more of a number of questions the consumer is required to correctly answer, types of questions the consumer is required to answer, or a percentage of questions that must be correctly answered.

In accordance with another aspect of the disclosure, a non-transitory computer-readable storage medium comprises computer-executable instructions that direct a computing system to: receive a request to set authentication requirements for a consumer in response to a request from the consumer to open a new account, wherein an identity of the consumer is unknown to operators of the computing system; determine device identification information associated with a device from which opening of the new account was requested by the consumer, the device identification information comprising one or more of device ID, device location, browser time zone, browser language settings, proxy settings, stated IP address, or real IP address; derive one or more behaviors of the consumer based on at least the device identification information, the one or more behaviors comprising one or more of a frequency of authentication requests for the consumer, total amount of time taken by the consumer to answer authentication questions, or whether the device location matches a location indicated by a browser executing on the device; calculate a risk of fraud associated with the consumer based on the one or more derived behaviors of the consumer; and determine authentication requirements for the consumer based on the calculated risk of fraud, wherein the authentication requirements indicate one or more of a number of questions the consumer is required to correctly answer, types of questions the consumer is required to answer, or a percentage of questions that must be correctly answered.

In accordance with another aspect of the disclosure, a computer-implemented method of setting authentication requirements for a consumer comprises: receiving a request to set authentication requirements for a consumer in response to a request from the consumer to open a new account, wherein an identity of the consumer is unknown to operators of the computing system; determining device identification information associated with a device from which opening of the new account was requested by the consumer, the device identification information comprising one or more of device ID, device location, browser time zone, browser language settings, proxy settings, stated IP address, or real IP address; deriving one or more behaviors of the consumer based on at least the device identification information, the one or more behaviors comprising one or more of a frequency of authentication requests for the consumer, total amount of time taken by the consumer to answer authentication questions, or whether the device location matches a location indicated by a browser executing on the device; calculating a risk of fraud associated with the consumer based on the one or more derived behaviors of the consumer; and determining authentication requirements for the consumer based on the calculated risk of fraud, wherein the authentication requirements indicate one or more of a number of questions the consumer is required to correctly answer, types of questions the consumer is required to answer, or a percentage of questions that must be correctly answered.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 1A is a flow diagram illustrating one embodiment of data flow in an illustrative operating environment for knowledge-based authentication.

FIG. 8A is an illustrative user interface that may be generated and presented to a consumer that is determined to be involved in potentially fraudulent authentication.

FIG. 8B is an illustrative user interface that may be generated and presented to a user who is determined to be involved in potentially fraudulent authentications for purposes of capturing information from the user.

DETAILED DESCRIPTION

Authentication may involve detecting risk of fraudulent activity, such as stealing another consumer's identity and trying to open a new account under another person's name. Described herein are systems and methods for adjusting a difficulty level and or quantity of knowledge-based questions that may be asked of a consumer based on one or more generated risk scores associated with the consumer's behavior, which may be derived from information received from the consumer and/or from the consumers' computing device, for example.

Various embodiments of systems, methods, processes, and data structures will now be described with reference to the drawings. Variations to the systems, methods, processes, and data structures which represent other embodiments will also be described. Certain aspects, advantages, and novel features of the systems, methods, processes, and data structures are described herein. It is to be understood that not necessarily all such advantages may be achieved in accordance with any particular embodiment. Accordingly, the systems, methods, processes, and/or data structures may be embodied or carried out in a manner that achieves one advantage or group of advantages as taught herein without necessarily achieving other advantages as may be taught or suggested herein.

Example Knowledge-Based Authentication System Environment and Data Flow

FIG. 1A is a flow diagram illustrating one embodiment of data flow in an illustrative environment for a knowledge-based authentication system. One or more consumers may want to open an account. For example, a consumer 102 (where "consumer" refers to a computing device and/or an individual operating the computing device) may wish to install a new home security monitoring system, apply for a new credit card, join a fitness club, or open a credit monitoring account. The consumer may contact the service provider 103 (e.g., a representative or registration system of the home security system, credit card, fitness club, credit monitoring account, etc.), which may require the consumer 102 to be authenticated before accepting his new account opening request. In order to authenticate the consumer, the service provider 103 may send an authentication request to an authentication system 101, which may be configured to determine additional information required from the consumer 102 in order to authenticate the consumer and/or interface with the consumer either directly (via the network 108) or through the service provider 103 in order to authenticate the consumer (or determine that the consumer is not authenticated).

In some embodiments, consumers may submit information needed for authentication to the authentication system 101 such as at the request of the service provider 103.

Figure 1B:
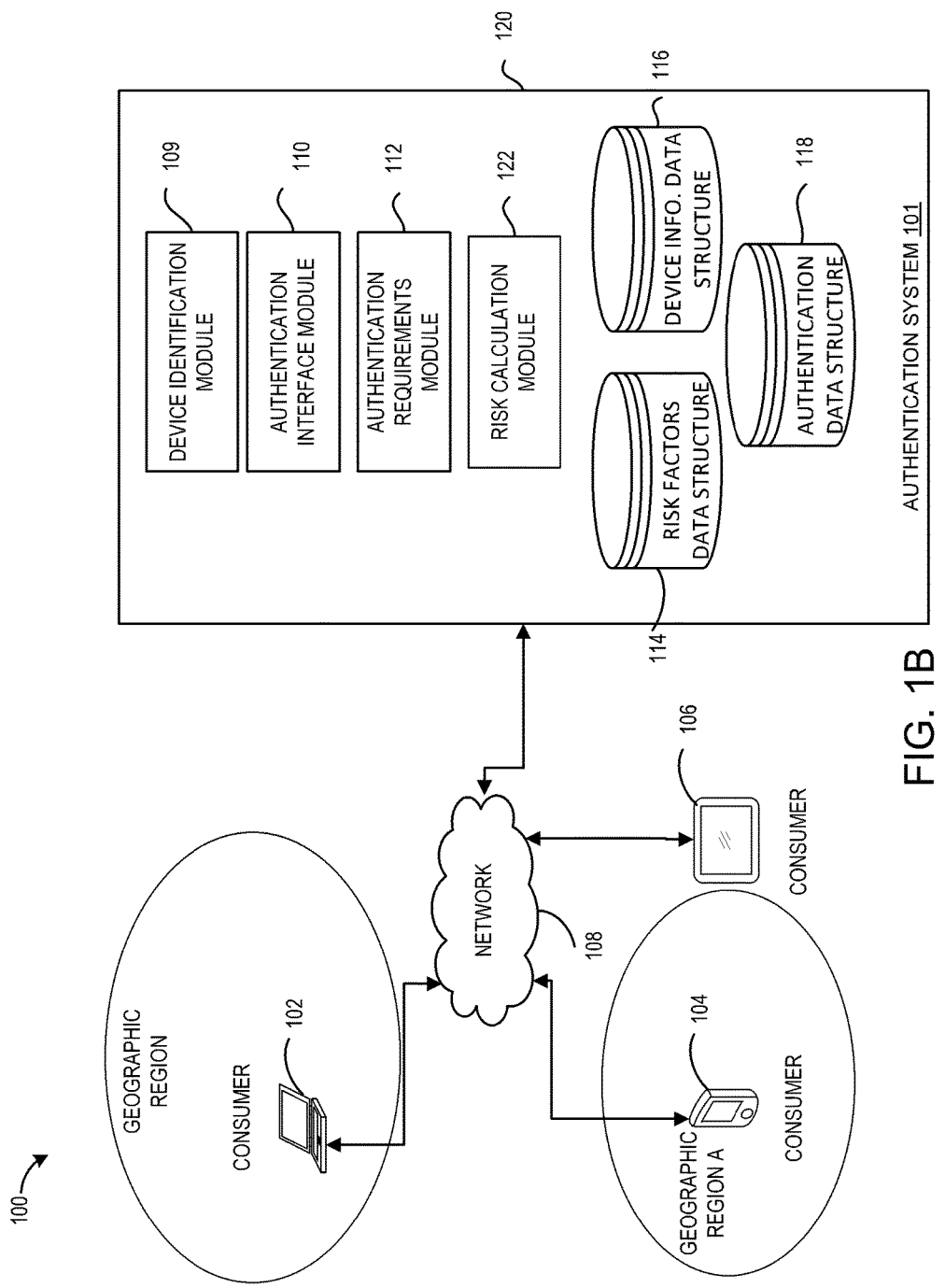
FIG. 1B is a block diagram illustrating an embodiment of system architecture in which multiple consumers 102, 104, 106 are in communication with an authentication processing system

FIG. 1B is a block diagram illustrating an example system architecture in which multiple consumers 102, 104, 106 are in communication with an authentication processing system 101, wherein the authentication processing system 101 is configured to authenticate the consumer. Depending on the embodiment, the authentication system 101 may include a device identification module 109, an authentication interface module 110, an authentication requirements module 112, and a risk calculation module 122.

According to some embodiments, the device identification module 109 may collect and process received device information. Device identification information may include device attributes, such as a device ID, device location, browser time zone, browser language settings, proxy settings, stated IP address, or real IP address. For example, a consumer 102 may be directed to a web interface to enroll in the home security monitoring service (that requires authentication). During the authentication process, information including internet usage, GPS location, and other device related data may be gathered from the consumer 102's mobile device 104 (e.g., using a script that runs in the background on the device and gathers the information), and the device identification module 109 may analyze such information to determine a location of the consumer 102's computing device. The device identification module 109 may also gather and analyze information that may reveal the consumer 102's real location instead of a location masked by an IP address. For example, if consumer 102's computing device communicates with the authentication system 101 through a Virtual Private Network ("VPN") or a proxy, then the real location of the consumer 102 may not be the same as an addressed associated with his IP address. The device identification module 109 may determine the real location of consumer 102 by analyzing current GPS data, historical GPS data, and relevant internet traffic indications such as the whether the device's IP address is associated with a known proxy server address.

In some embodiments, the authentication interface module 110 may generate one or more interfaces so that consumers may be asked questions that may be used to verify their identities. In other embodiments, authentication questions are asked of the consumer orally on a phone, for example. Depending on the embodiment, the authentication interface module 110 may also include device-aware parameter-submitting code (such as device id="NOKIA_ModelXYZ_OperatingSystem_ver1.1" user_agent="Mozilla/5.0 (Linux; U; OperatingSystem 1.1-update1; en-us; chn-big5) WebKit/525.10+ (KHTML, like Gecko) Version/3.0.4 Mobile Safari/523.12.2"), in the generated user interfaces so that information about consumers' computing devices may be gathered. In some embodiments, the authentication interface module 110 may determine one or more behaviors of the consumer, such as based on the device identification information. For example, the behavior information may indicate a total number of times and/or frequency of a consumer requesting authentication (e.g., from the authentication system 101) during any given timeframe, such as for multiple services for which the authentication processing system 101 provides authentication services, a total time a consumer spends answering authentication questions presented to him or her, or whether the device location matches a location indicated by a browser executing on the device.

In some embodiments, the risk calculation module 122 may calculate a risk score or determine a risk level based on information received from a consumer and/or the consumer's computing or mobile device. For example, if a consumer states that she lives in Oregon but her device IP address indicates she lives in Siberia, then the risk calculation module 122 may increase the risk level (or risk score) associated with this consumer. In another example, if a consumer has approached the authentication system 101 three times (for enrollment in a same service or for enrollment in two or more different services) before but failed all three authentication attempts, the risk calculation module 122 may also increase the risk score or risk level associated with the consumer. Furthermore, in some embodiments, if a consumer's stated address is also associated with several other consumers (and/or consumers that are about the same age and/or have similar demographic information), the risk calculation module 122 may accordingly increase the risk score or risk level associated with the consumer.

According to some embodiments, the authentication requirements module 112 may generate and present various quantities and/or difficulties of questions to consumers, such as based on risk information generated by the risk calculation module 122. In addition, other criteria may be used for generating questions of various quantities or difficulty. For example, the risk calculation module 122 and/or the authentication requirements module 112 may adjust the authentication requirements for a consumer in response to determining that the consumer has taken a longer than normal time to answer authentication questions. Thus, during a single authentication session (e.g., a set of questions configured to authenticate a consumer), authentication requirements may be adjusted, such as by presenting more difficult (or less difficult) questions and/or additional (or fewer) questions. Additionally, risk score information may be stored and used in a later authentication request for a consumer or device, such as to adjust the authentication requirements.

Depending on the embodiment, the authentication system 101 may also include several data structures that store authentication related data. For example the authentication system 101 may include a risk factors data structure 114, which may store data and/or information related to potential risk factors, risk scores, and/or risk levels associated with respective consumers. The authentication system 101 may also include a device information data structure 116, which may in some embodiments store device information, location information associated with devices, IP addresses, MAC addresses, browser settings, proxy settings, and so forth. Depending on the embodiment, the authentication system 101 may also include an authentication data structure 118. The authentication data structure 118 may store information about consumers, computing devices, and so forth that may be used to generate authentication questions, which may be presented to consumers.

As illustrated in FIG. 1, the network 108 may comprise one or more of a LAN, WAN, and/or the Internet. The network 108 communicates with various modules, computing devices, and/or other electronic devices via wired or wireless communication links, and/or combination of wired and wireless communication links.

Example Computing System

Figure 2:
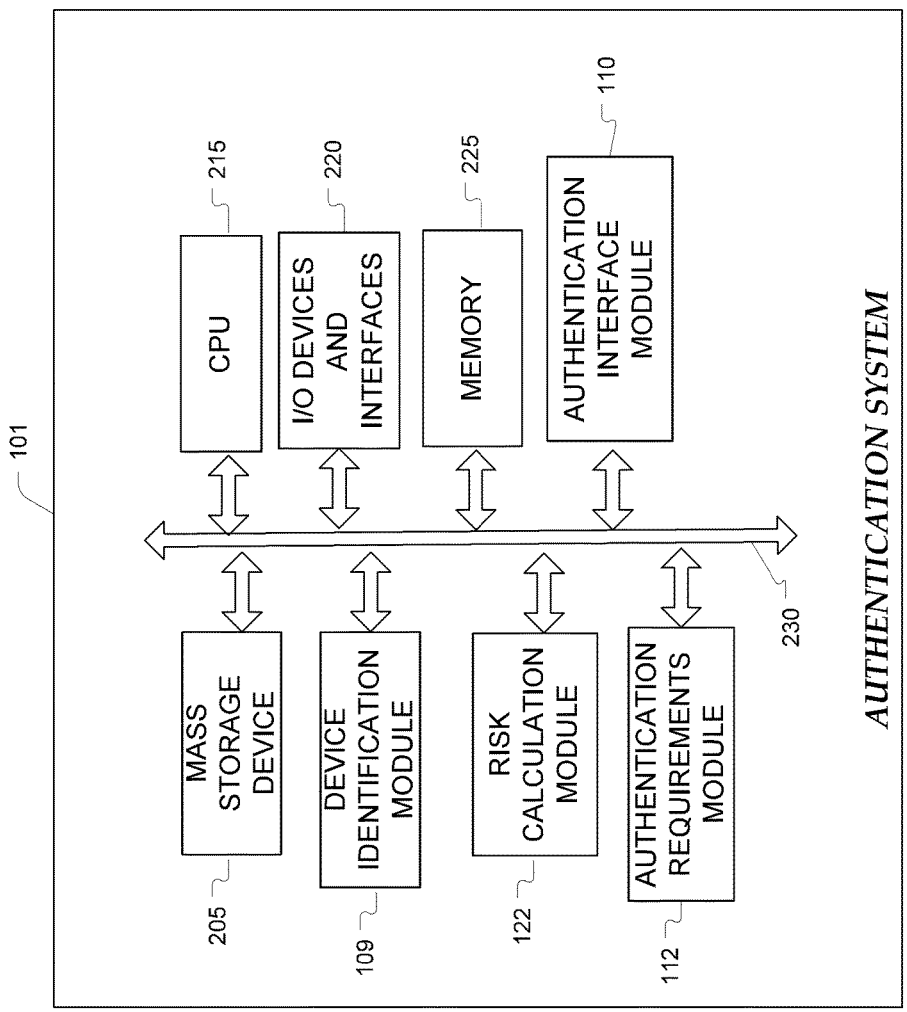
FIG. 2 is a block diagram illustrating one embodiment of a system for knowledge-based authentication.

FIG. 2 is a block diagram illustrating example components of the authentication system 101. While the components illustrated in FIG. 2 are discussed with reference to the authentication system 101, any other computing devices discussed and/or illustrated herein may include any or all of these same or similar components.

The authentication system 101 includes, for example, a computer that may be IBM, Macintosh, or Linux/Unix compatible or a server or workstation. In one embodiment, the authentication system 101 comprises a server, desktop computer, a tablet computer, or laptop computer, for example. In one embodiment, the exemplary authentication system 101 includes one or more central processing units ("CPUs") 215, which may each include a conventional or proprietary microprocessor. The authentication system 101 further includes one or more memory 225, such as random access memory ("RAM") for temporary storage of information, one or more read only memory ("ROM") for permanent storage of information, and one or more mass storage device 205, such as a hard drive, diskette, solid state drive, or optical media storage device. Typically, the modules of the authentication system 101 are connected to the computer using a standard based bus system 230. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of authentication system 101 may be combined into fewer components and modules or further separated into additional components and modules.

The authentication system 101 is generally controlled and coordinated by operating system software, such as Windows XP, Windows Vista, Windows 7, Windows 8, Windows Server, Unix, Linux, SunOS, Solaris, or other compatible operating systems. In Macintosh systems, the operating system may be any available operating system, such as MAC OS X. In other embodiments, the authentication system 101 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary authentication system 101 may include one or more commonly available input/output (I/O) devices and interfaces 220, such as a keyboard, mouse, touchpad, and printer. In one embodiment, the I/O devices and interfaces 220 include one or more display devices, such as a monitor, that allows the visual presentation of data to a user. More particularly, a display device provides for the presentation of GUIs, application software data, and multimedia presentations, for example. The authentication system 101 may also include one or more multimedia devices, such as speakers, video cards, graphics accelerators, and microphones, for example.

In the embodiment of FIG. 2, the I/O devices and interfaces 220 provide a communication interface to various external devices. In the embodiment of FIG. 2, for example, the authentication system 101 also includes the authentication interface module 110, the device identification module 109, the authentication requirements module 112, and the risk calculation module 122 (discussed above with reference to FIG. 1B) that may be stored in the mass storage device 205 and/or memory 225 as executable software codes that are executed by the CPU 215. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 103, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, one or more computing systems, data stores and/or modules described herein may be implemented using one or more open source projects or other existing platforms. For example, one or more computing systems, data stores and/or modules described herein may be implemented in part by leveraging technology associated with one or more of the following: Drools, Hibernate, JBoss, Kettle, Spring Framework, NoSQL (such as the database software implemented by MongoDB) and/or DB2 database software.

Example Method of Adjusting Knowledge-Based Authentication ("KBA")

Figure 3:
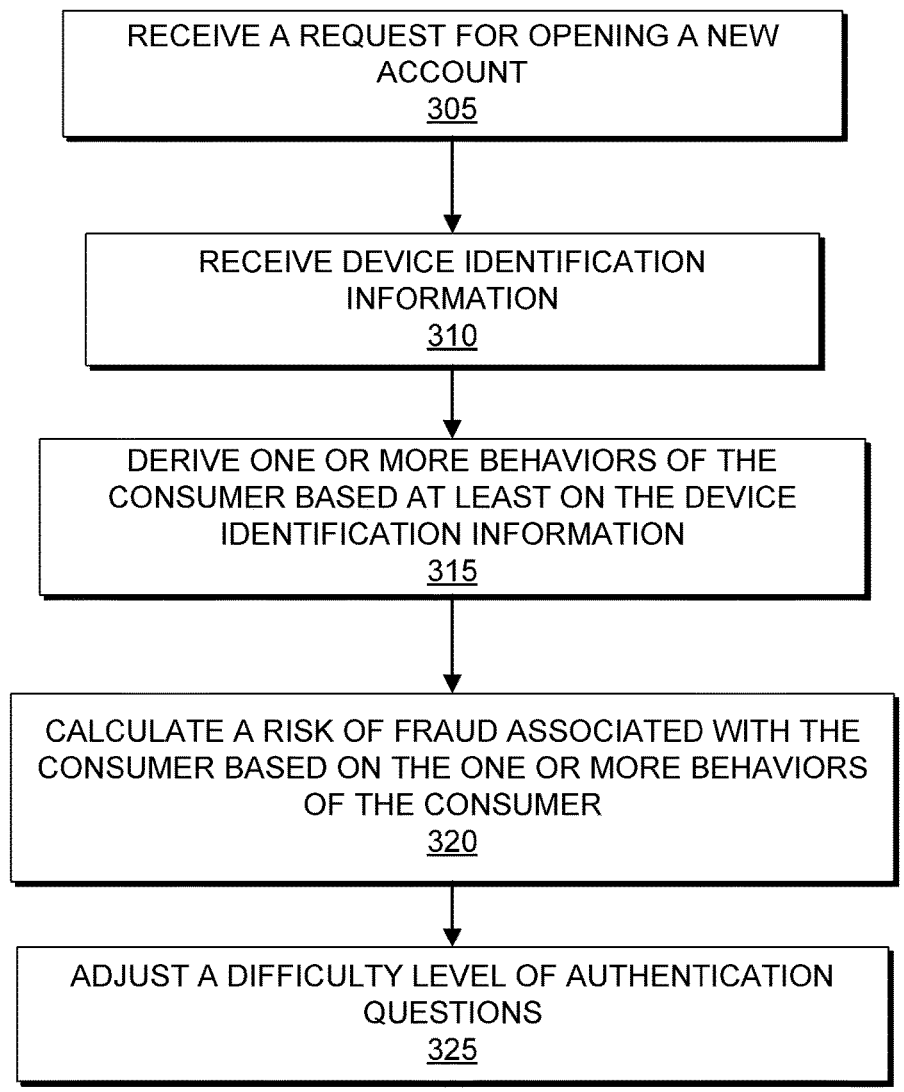
FIG. 3 is a flowchart that illustrates one embodiment of a process of authenticating the identity of a consumer.

FIG. 3 is a flowchart that illustrates one embodiment of a method of determining a difficulty level of authentication for a particular consumer. The method of FIG. 3 may be performed by the authentication system 101, such as the various modules of the authentication system 101. Alternatively, the method may be performed, in whole or part, by another computer device, such as partially by a consumer device and partially by the authentication system 101. For ease of description, the method will be discussed herein as being performed by the authentication system 101, but such description does not preclude performance of the method by multiple devices. Depending on the embodiment, the method may include fewer or additional blocks and/or the blocks may be performed in an order that is different than illustrated.

The method 300 begins at block 305, where a request for opening a new account is received. The new account may be an account of any type. For example, in some embodiments, the new account may be a credit line, satellite TV service, college admission, credit monitoring, or any other. In one embodiment, the particular consumer is anonymous to the authentication system 101 when the authentication request is received. For example, because the consumer is requesting a new account, the service provider likely doesn't already have identification information of the consumer.

In some embodiments, the request for opening a new account may come from a third party, such as a service provider, rather than directly from a consumer. For example, a retail store may initiate authentication of a consumer with the authentication system 100 in order to determine whether a new store credit account for the consumer that purchased some merchandise at the retail store should be opened. Similarly, an employer may send a request to an insurance company to request a new account be set up for one of its employees and, in response to the request, the insurance company may initiate authentication of the employee with the authentication system 100. In some other embodiments, the request for opening a new account may come directly from a consumer or a group of consumers. For example, a consumer may request authentication, which may then be provided to another entity (e.g., via an authentication token) as proof that authentication has been performed.

In some embodiments, a request for opening a new account may be sent via a post card, by mail, via a phone call, or other means besides on-line submission. For example, a consumer may submit paperwork needed to open a new account in a letter. A consumer may also initiate the request by a postcard and/or through a phone call. For example, the consumer may call into a call center and request to open a new account. A representative at the call center may enter information provided by the consumer via a use interface similar to ones disclosed herein to provide details regarding the consumer and the consumer's new account request.

The received request to open a new account may be received directly by a service provider, which may perform authentication itself. In some embodiments, the received request to open a new account may be received by a service provider and then forwarded to the authentication system 101. The authentication system 100 may then be put in direct contact with the consumer to complete the authentication, such as via a phone call, web form, email, and/or any other communication medium, and/or the authentication system 100 communicates with the consumer via the service provider, such as via a Iframe embedded in a website of the service provider.

The method 300 proceeds to block 310, where identification information regarding a consumer's computing device or mobile communication device is received. In some embodiments, the received information may include one or more IP addresses (real IP address, stated IP address, and so forth), device type, device manufacturer, device serial number, and so forth. For example, the information may be obtained by the device identification module 109 by embedding a script sent to a consumer's device and analyzing the information gathered from the script. For example, information received from the embedded script may include: "device name=MyPC, model name=PC123, Operating System=OS1.0, Application=MyBrowser, TouchScreenDevice=No, PhysicalScreenWidth=1024×768, IP address=100.100.100.100."

The method 300 proceeds to block 315, where one or more behaviors of the consumer may be derived based at least on the device identification information received. Such information may be used by the device identification module 109 to identify attributes of the device and/or consumer that may warrant an increased or decreased risk level associated with the consumer and, thus, an increased or decreased difficulty level associated with authentication of the consumer. For example, any inconsistencies, such as discrepancy between a real IP address and a stated IP address, may indicate an increased risk, which may lead to a greater quantity and/or difficulty level of authentication questions asked of the consumer. In some embodiments, other behaviors of the consumer may also include having already used the same device to attempt authentication unsuccessfully before. Depending on the embodiment, the behaviors of the consumer may be stored in a device information data structure 116.

The method 300 proceeds to block 320, where a risk of fraud associated with the consumer may be calculated based on the one or more behaviors of the consumer. For example, if a consumer's device has a stated IP address that is in Virginia, USA, but the device's unmasked real IP address revealed through software tools indicate that the device is in Thailand, then the risk calculation module 122 may use such information in the calculation of the risk of fraud involved with the consumer.

In some embodiments, if a consumer has already attempted authentication several times unsuccessfully, the risk calculation module 122 may also use such information as a factor in calculating the risk of fraud involved with the consumer.

Depending on the embodiment, the risk of fraud associated with the consumer may be represented as a risk score, which could be a numerical value. The risk of fraud may also be represented as a risk level, which may or may not be a numerical value.

The method 300 then proceeds to block 325, where a quantity and/or difficulty level of authentication questions may be determined and/or adjusted (e.g., from a default level) based on the calculated risk of fraud. In some embodiments, the adjustment is done by the authentication requirements module 112 using information stored in the risk factors data structure 114 and authentication data structure 118.

For example, the authentication system 101 may present questions of low levels of difficulty in response to a determination that the consumer has a low risk of fraud or a low risk score. The questions presented to the consumer may include basic questions that help verify the consumer's identity.

If, however, the consumer has a high risk of fraud or a high risk score, the questions presented to the consumer may include more difficult questions and/or more questions. For example, the authentication requirements module 112 may use information stored in the authentication data structure 118 to generate more difficult questions such as "Please name at least 2 public libraries next to your residence" and/or "Which of the following banks is one that you do not have an account with," and so forth. In one embodiment, the authentication questions are determined based on credit information of the consumer. For example, information regarding previous addresses, mortgage payments, credit card balance amounts, items purchased, etc., that typically no one other than the individual identified in the credit report (and possibly a spouse and a few other trusted individuals) would know about. Thus, asking questions about this information can help authenticate that the consumer really is who they say they are, in view of them knowing the information that is included on the credit report of the person that they are claiming to be. In other embodiments, various other sources of authentication questions may be used in order to ask questions of the consumer in an attempt to confirm that the consumer really is who they say they are.

In some embodiments, difficulty level of questions presented to a consumer may be dynamically adjusted. For example, if the authentication system 101 detects that the consumer has spent 5 minutes (or some other predetermined time) trying to answer a specific question, which may be considered too long by the authentication system 101, the authentication system 101 may generate an additional and/or a more difficult question for the consumer to answer. For example, if the consumer takes five minutes to provide his/her birthday (or other information that the consumer should be able to readily provide), the risk associated with the consumer may be increased and additional questions provided to that consumer may be of an increased difficulty and/or quantity.

Dealing with High Risk Consumers

In some embodiments, the system may automatically choose and present, based at least in part on difficulty level of questions, trick questions (also referred to as "false questions") to the consumers. For example, the false question may be: "What is the name of your daughter's first elementary school" when the system, in fact, knows that the identify used in requesting a new account does not have a daughter. In another example, the question may be: "Please indicate which branch of the ABCD Bank is the one that you visit most frequently" when in fact the system is aware that the identity used in requesting a new account does not have an account at the ABCD Bank.

In addition to false questions, the system may also provide false answers. For example, the system may mix real answers and false answers and present the mixed set of answers to both real and false questions to a consumer. In some embodiments, the false questions and false answers are generated randomly and automatically by the system. In some other embodiments, the false questions may also be ranked as to their respective levels of difficulty and presented to consumers by the system based on the chosen level of difficulty. For example, if a consumer is deemed high risk, the system may choose more difficult false questions and present them to the consumer. Examples of relatively easy authentication questions may be "What is your date of birth?" and "What is your mother's maiden name?" Examples of more difficult authentication questions include, for example, "What is your address from 1999-2001?" and "Did you have a car loan for approximately $40,000 in 2005 with CarBuyingCo?"

Depending on the embodiment, in response to the authentication system determining that a consumer is a high risk for fraud, the system may provide automatically generated error messages to the user. For example, instead of telling a user that he provided a wrong password but his email address was correct, which may risk giving a high-risk consumer too much information, the system may instead provide a message such as "Your information does not match our records," "Your mailing address is wrong," "Your age does not match our records," or even "the system has experienced serious problems, please try again later," etc. These intentionally false random error messages provide as little information as possible to a potentially fraudulent situation and do not aid the person who might be committing fraud in correcting any information and resubmitting a request.

In some embodiments, a combination of false questions and automatic random error messages may be used and no real question is presented to a consumer who has a particularly high risk of fraud. In some other embodiments, real questions, false questions, and automatic random error messages may all be used at the same time and presented to a user who was considered as a high risk of fraud. In some other embodiments, real questions, false questions, and automatic random error messages may be configured to have difficulty levels and presented to a consumer based on the consumer's level of risk for fraud. Further examples of dealing with high risk consumers are discussed below with reference to FIG. 7-9.

In some embodiments, besides adjusting the difficulty levels of questions, the authentication system 101 may also generate more questions that a consumer may have to answer correctly before the consumer can be authenticated.

Example User Interfaces

Figure 4:
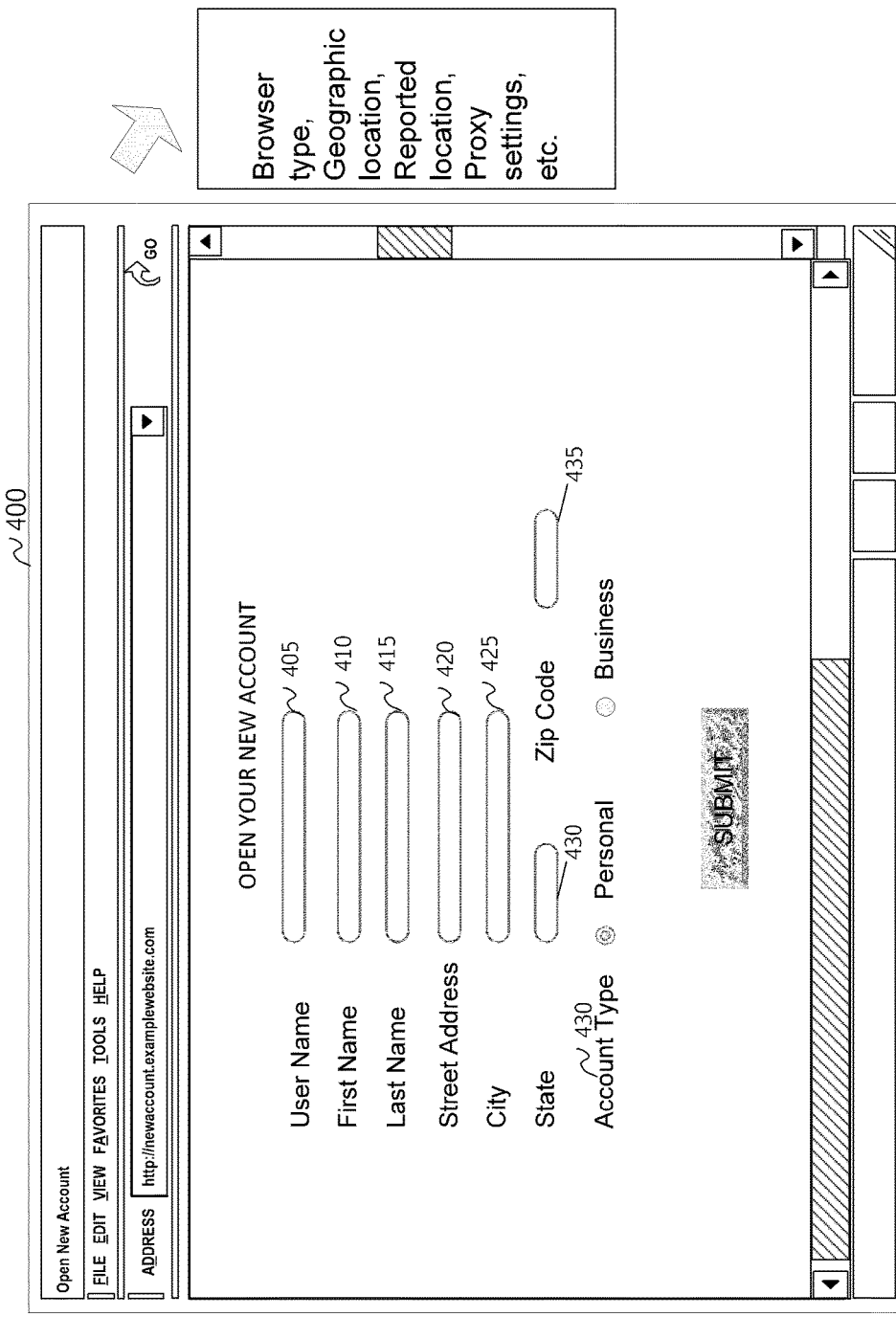
FIG. 4 is an illustrative user interface that may be generated and presented to a consumer, which includes questions presented to the consumer for the purpose of opening a new account and also tools that gather browser and/or computing device related information.

FIG. 4 is an illustrative user interface 400 that may be generated and presented to a consumer or a person who is tasked with entering information related to a consumer, which includes questions presented to the consumer for the purpose of opening a new account and also tools that gather browser and/or computing device related information. The authentication system 101 and/or the authentication interface module 110 may be used to implement systems and methods described in this disclosure.

In this embodiment, the user interface 400 gathers information from a consumer or a person responsible for entering information related to a consumer so that the consumer may start the process of authentication. The information gathered may include: user name 405, first name 410, last name 415, street address 410, city 425, state 430, zip code 435, and/or account type 430, which may be personal or business.

In some embodiments, the person responsible for entering information related to a consumer may be a representative of a call center who helps enter information for opening credit accounts. In some other embodiments, the person responsible for entering information related to a consumer may be a representative of a credit bureau, a retailer, a hospital, an insurance company, a fitness club, a potential employer, etc., who helps enter information for opening a new account.

In this example, the user interface 400 is presented in a browser. The authentication system 101, via the device identification module 109, may receive additional metadata and/or device related information. For example, information may be gathered when the user types in the text fields and/or when the user submits the information. The information may include, for example, browser type, geographic location, reported location, proxy settings, and so forth.

In some embodiments, if the browser type is a mobile phone browser, but the device information associated with the computing device indicates that the consumer uses a desktop computer, the risk calculation module 122 may use such information to increase the level of risk or increase a risk score associate with the consumer.

In addition, as discussed previously, if the computing device of the consumer has a real IP address discovered by the device identification module 109, but the consumer's stated IP address does not match the real IP address, then the risk calculation module 122 may also use such information to increase the level of risk or increase a risk score associate with the consumer.

Figure 5:
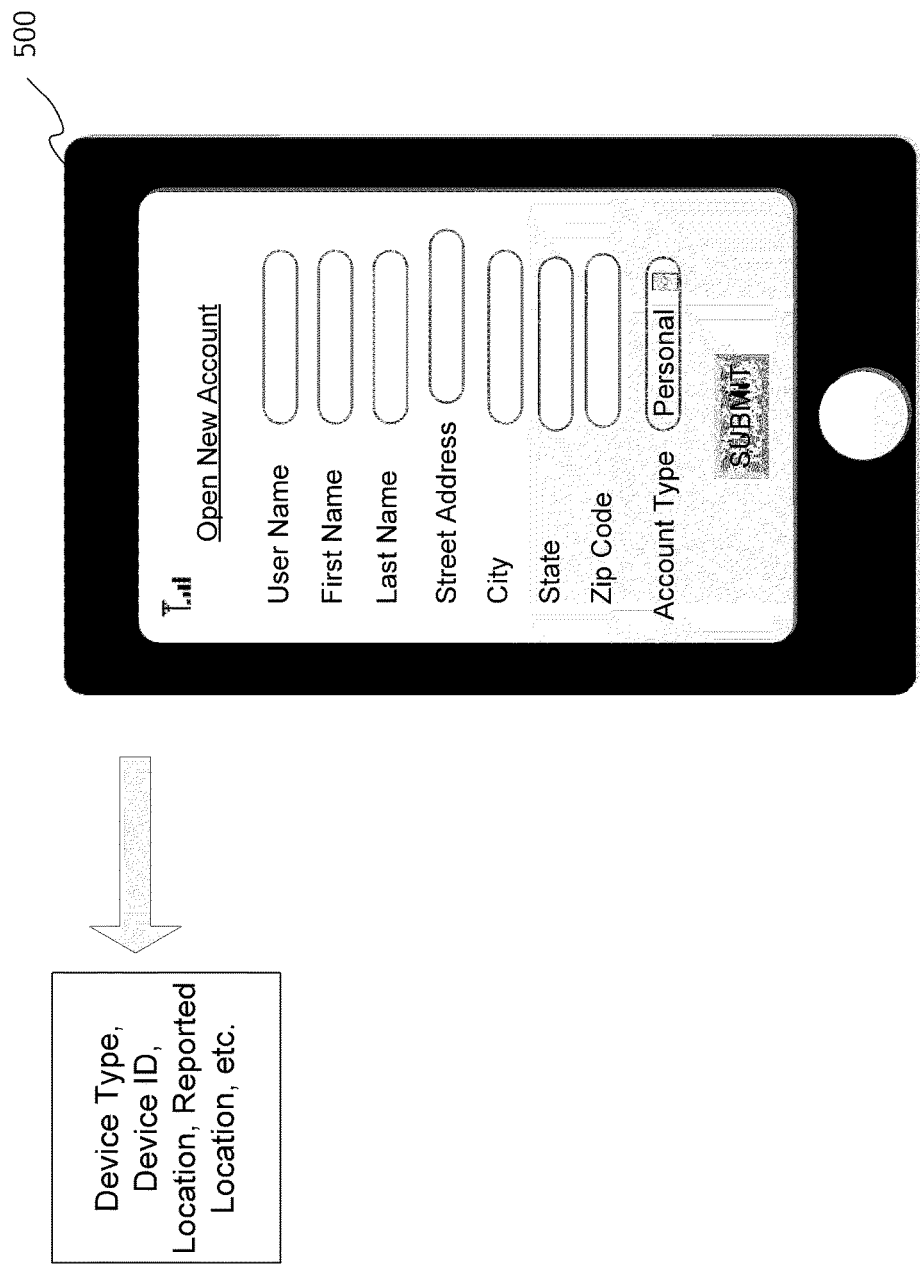
FIG. 5 is an illustrative user interface that may be generated and presented to a mobile consumer, which includes questions presented to the consumer for the purpose of opening a new account and also tools that gather mobile device and related information.

FIG. 5 is an illustrative mobile user interface 500 that may be generated and presented to a mobile consumer, which includes questions presented to the consumer for the purpose of opening a new account and also tools that gather mobile device and related information. The authentication system 101 and/or the authentication interface module 110 may be used to implement systems and methods described in this disclosure. The term "mobile user interface" here may include user interface generated and presented to a user of a mobile computing device, such as laptop, mobile phone, and/or tablets, and so forth.

The user interface 500 may include questions for a consumer so that the consumer may start the process of authentication. The information gathered may include: user name, first name, last name, street address, city, state, zip code, and/or account type, which may be personal or business.

As shown in FIG. 5, information regarding the mobile computing device's device type, device ID, location, reported location, and so forth, may be gathered by an authentication system 101 in order to generate authentication questions. Any discrepancies between a location of the mobile computing device and its reported location may trigger a higher risk score or risk level, so that in some embodiments, more difficult authentication questions may be presented to the consumer.

Example Method of Generating a Risk Score

Figure 6:
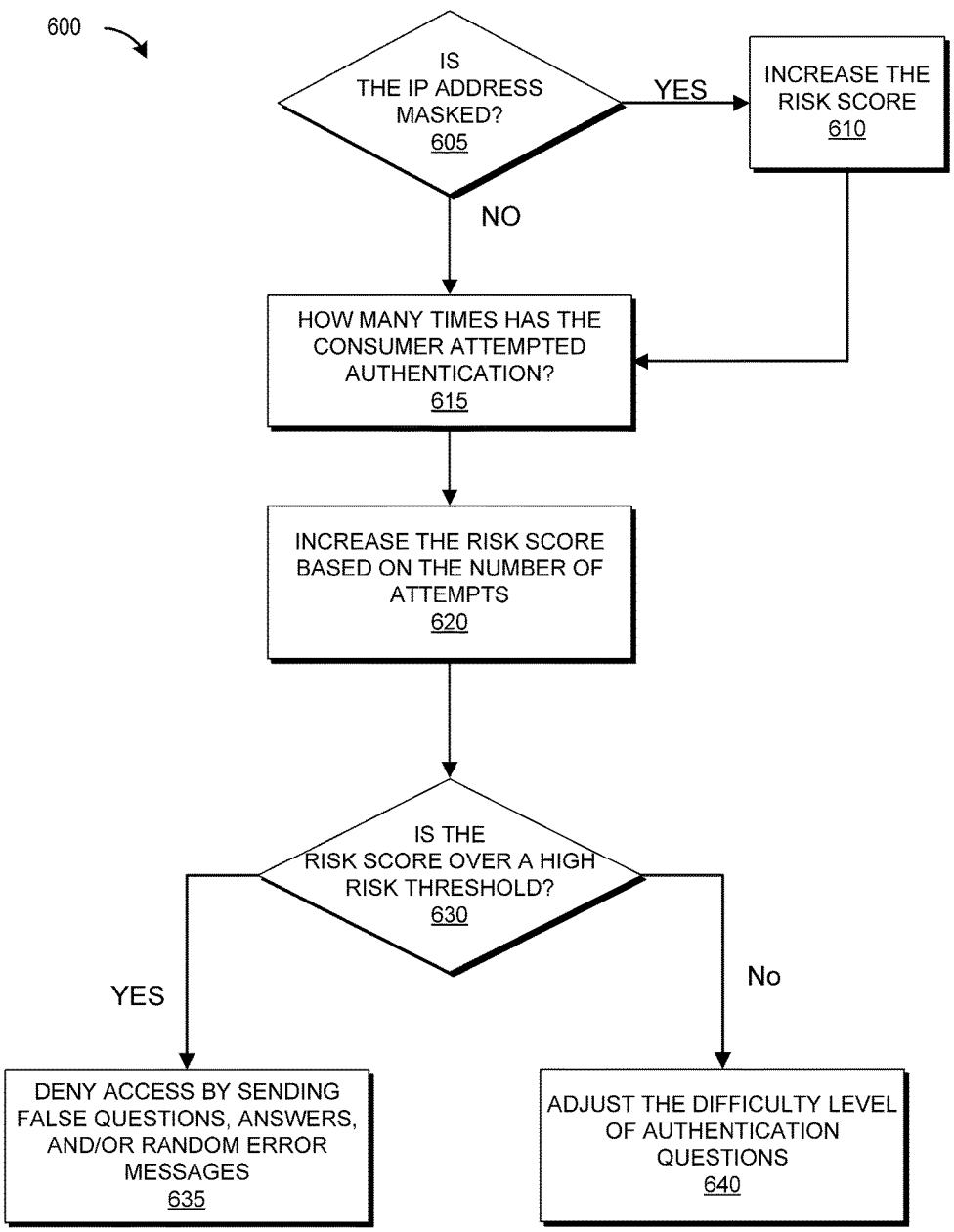
FIG. 6 is a flowchart that illustrates one embodiment of determining a risk score and using the risk score to determine whether a consumer's fraud risk is so high that the system will refuse to authenticate the consumer.

FIG. 6 is a flowchart that illustrates one embodiment of determining a risk score and using the risk score to determine whether a consumer's fraud risk is so high that the system will refuse to authenticate the consumer. The method of FIG. 6 may be performed by the authentication system 101 and/or via any other suitable computing system. Depending on the embodiment, the method may include fewer or additional blocks and/or the blocks may be performed in order different than is illustrated.

The method 600 begins at decision block 605, wherein the system determines whether the consumer's IP address is masked. If the consumer has a masked IP address and/or the masked IP address's geolocation does not match the consumer's real geolocation, the method 600 proceeds to block 610 and increase the risk score of the consumer. For example, if a person uses a proxy service that is available for free or for a fee (so that the person can connect to a proxy server first and direct all internet traffic through the proxy server), his or her real IP address would be hidden. Instead, the proxy server's IP address will be show. The device identification module 109 may determine that the device's purported address is really just a proxy server's IP address by looking up the purported IP address in a data store of known proxy server addresses. If so, the device identification module 109 may be configured to automatically notify the risk calculation module 122 so the risk level associated with the device can be adjusted. Moreover, if the proxy server's IP address is associated with a known malicious group for identity theft or other related crimes or violations, the risk calculation module 122 may adjust the risk level accordingly. However, if the proxy server's IP address is associated with a known cloud-service provider that provides virtual computing capacities to companies or a known employer which masks all of their employee's IP addresses, the device identification module 109 may determine that the device is affiliated with a known organization with low risk. The risk calculation module 122 may then adjust the risk level accordingly.

If the consumer does not have a masked IP address, the method 600 may proceed to block 615 and determine how many times the consumer has attempted authentication before. In some embodiments, the system may derive the information based on information in a data store. In some other embodiments, the system may derive the information based on real-time and/or number of attempts in a recent session. Alternatively, the system may also count the number of times the consumer has attempted authentication in a given period of time, e.g., in the last two months, the last week, the last year, etc., such as based on authentication requests from various other service providers.

The method 600 proceeds to block 620, wherein the consumer's risk score is increased based on the number of attempts. For example, the system may increase the risk score of the consumer by one for each unsuccessful attempt. In some embodiments, the system may assign different weight based on how recent the failed authentication attempt was. For example, a very recent attempt would have a weight higher than a more distant failed attempt to authenticate. Further, in some embodiments, the system may use other formulae to increase the risk score based on the number of past attempts to authenticate. The formulae used may be, for example, based on a risk of fraud analysis modeled using normal distribution, binomial distribution, etc.

In some embodiments, the method 600 proceeds to decision block 630 wherein it is determined whether the risk score is over a pre-determined high risk threshold. For example, if the risk score of the consumer is higher than the pre-determined high risk threshold, the risk that the consumer is committing authentication fraud may be deemed too high to be acceptable by the system and/or an entity requesting authentication (e.g., each entity requesting authentication may require different levels of authentication). In such situations, the method 600 proceeds to block 635, wherein the risk information is communicated to a requesting entity, such as to deny opening of an account.

However, if the risk score of the consumer is not so high as to be more than the high risk threshold as determined in the block 630, the method 600 proceed to block 640, wherein the difficulty level of the authentication questions are determine/adjusted based on the determined risk score. Once the authentication question difficulty is determined (e.g., block 640), the authentication questions may be asked of the consumer, via direct communication between the authentication system and the consumer and/or communication between the authentication system and the consumer via a service provider. In some embodiments, the method of FIG. 6, or certain blocks of FIG. 6, may be performed as authentication questions are being provided to the consumer, such that at block 648 previously determined authentication question difficulty level or quantity may be adjusted based on previous responses, device identification information, and/or determine behaviors of the consumer.

Figure 7:
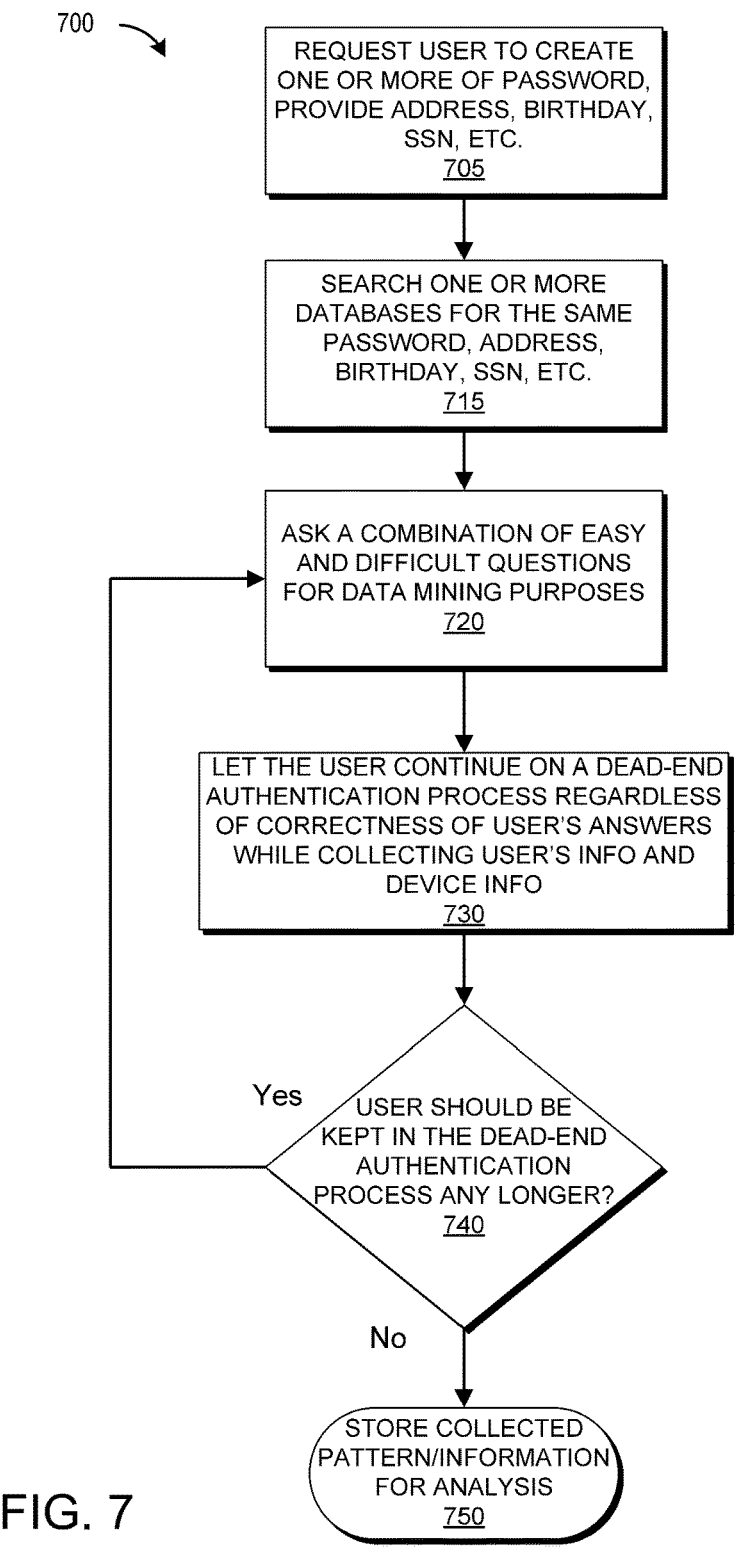
FIG. 7 is a flowchart that illustrates one embodiment of tracking behavior of a user with high fraud risk and leading the user to a dead-end authentication process.

Example Method of Dead-End Authentication and Collecting Information from High Fraud Risk Consumers FIG. 7 is a flowchart that illustrates one embodiment of tracking behavior of a user with high fraud risk and leading the user to a dead-end authentication process. The method of FIG. 7 may be performed by the authentication system 101 and/or via any other suitable computing system. Depending on the embodiment, the method may include fewer or additional blocks and/or the blocks may be performed in order different than is illustrated.

The method 700 begins at block 705, wherein the authentication system 101, through a user interface or an operator at a call center, requests a consumer who is deemed to be involved with a high risk of fraud, to do one or more of the following: create a password, provide an address, birth date, Social Security Number (SSN), and so forth. The method 700 then proceeds to block 715, wherein the authentication system 101 searches one or more databases using the information provided by the consumer, including searching the database for the same password, address, birthday, SSN, and so forth. The method 700 may store the information provided by the user and in particular, record if any hits or results were returned based on the results of the search. Such information may be used by the authentication system 101 to identify the same high risk user again in the future.

The method 700 proceeds to block 720, wherein the authentication system 101 requests the consumer to answer a combination of easy and difficult questions for purposes of collecting more data from the consumer. The questions asked by the authentication system 101 may be similar to typical authentication questions used by the system so that the consumer does not suspect that these questions were asked for purposes of collecting information from him/her. An embodiment of an easy question may be "What is your mother's maiden name?" An embodiment of a more difficult question may include "What is the name of the city you live in when you were 21 years old?"

The method 700 then proceeds to block 730, wherein the authentication system 101 lets the consumer continue on the dead-end authentication process, regardless of correctness of the user's answers. The authentication system 101 collects the consumer's answers, information, and information about the consumer's device. The authentication system 101 may do this in order to find out more about the potentially high risk consumer and better identify characteristics of such high risk consumers in the future.

The method 700 then proceeds to block 740, wherein the authentication system 101 determines whether the user should be kept in the dead-end authentication process any longer. Depending on the embodiment, the authentication system 101 may use a variety of criteria to make this decision. For example, the authentication system 101 may determine that enough information about the consumer and the consumer's device has been collected so that the consumer should not be kept in the dead-end authentication process anymore.

In some other embodiments, the authentication system 101 may determine that the consumer has not answered enough questions about his or her physical location or past credit history. Therefore, the authentication system 101 may decide to keep the consumer in the dead-end authentication process until the authentication system 101 has collected enough physical location or past credit history information.

If the answer to the question in decision block 740 is yes (that is, the consumer should be kept in the dead-end authentication process), the method 700 proceeds back to block 720, wherein the system again prompts the user to answer questions for data mining and data collection purposes.

However, if the answer to the question in decision block 740 is no (that is, the consumer does not need to be kept in the dead-end authentication process), the method 700 proceeds to block 750, wherein the authentication system 101 stores the collected information and usage patterns of the consumer in order to analyze the consumer's behavior. For example, if the password provided by this consumer is a non-trivial combination of characters, numbers, and symbols, such passwords may be used to detect whether this unusual password is reported as used in other instances. If a match is found, the authentication system 101 may submit such information for further analysis to determine whether the other instances involve a high risk of fraud as well.

FIG. 8A is an illustrative user interface 800 that may be generated and presented to a consumer that is determined to be involved in potentially fraudulent authentication. In this example, the user interface 800 is presented in a browser on a consumer's mobile computing device. However, the user interface may also be presented in an application or other types of user interfaces that can be used on a consumer's laptop, desktop, tablet, and other mobile computing devices. The authentication system 101, via the authentication interface module 112, may generate and present this user interface to a consumer who is may be involved with a high fraud risk. The user interface 800 may generate a message that communicates to the consumer that the two passwords entered by the consumer during the authentication process do not match, when in fact the passwords matched each other. The user interface 800 may request the consumer to enter the password, re-confirm it, and provide an alternative email. A consumer who is involved with a high risk of fraud may use another password that is different from the ones previously entered. The authentication system 101 may collect the additional passwords in order to maximize the amount of information that the system can receive from this potentially high risk consumer for data mining and analysis purposes.

Similarly, FIG. 8B is an illustrative user interface 850 that may be generated and presented to a user who is determined to be involved in potentially fraudulent authentications for purposes of capturing information from the user. As in FIG. 8B, the authentication system 101 may request the user to provide his or her address, regardless of whether the information previously provided by the user was correct or not. Such address information collected from the high fraud risk consumer may be used for risk analysis purposes.

Figure 8C:
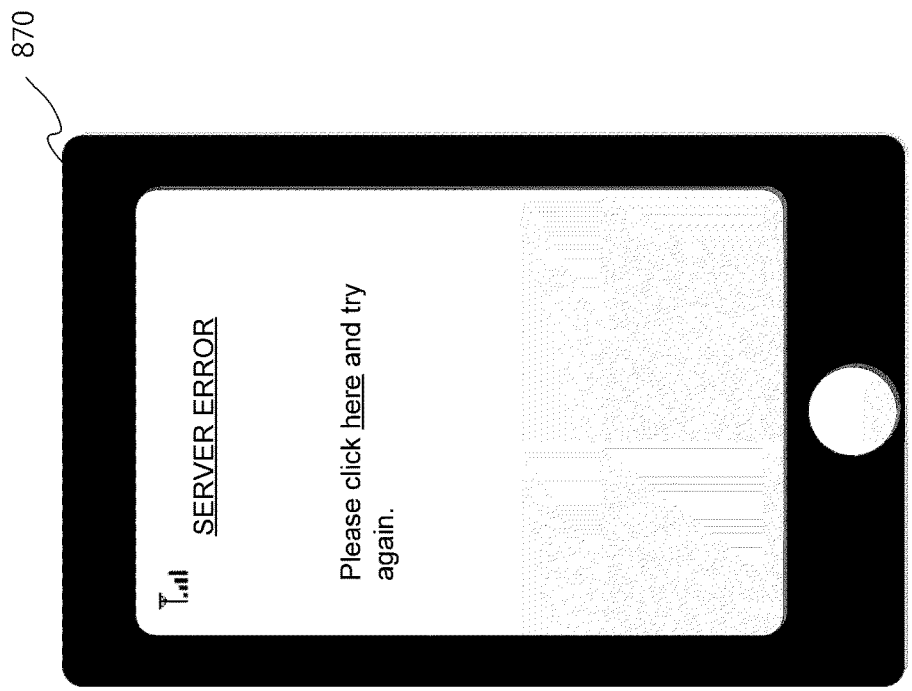
FIG. 8C is an illustrative user interface that may be generated and presented to a user who is determined to be involved in potentially fraudulent authentication.

FIG. 8C is an illustrative user interface 870 that may be generated and presented to a user who is determined to be involved in potentially fraudulent authentication so that at the end of authentication, the user is not provided with any hints regarding how to succeed in future fraudulent attempt to authenticate or any hints that the user has stepped into a honeypot. At the end of the authentication process, the authentication system 101 may provide a random error message so that a consumer with a potentially high risk of fraud may receive the random error message. The consumer, receiving a message such as "server error," may not suspect that he or she has been the target of a fraud analysis.

Another benefit of providing such a message using the illustrative user interface 870 is that the authentication system 101 will not let the consumer know what part of his or her answer triggered the system to detect his or her potential fraud. Minimizing such identifying information to the consumer may help minimize risk of providing useful information to a consumer with high risk of fraud so that the consumer is likely to find a way to get around the authentication system 101 in the future.

The illustrative user interface 870 may also provide a link back to a special version of the user interface so that if the consumer wants to be authenticated again, the consumer will be kept in the special version of the user interface for data collection and analysis process. The special version of the user interface may help ensure that the consumer or a device associated with the consumer's IP address can be quarantined in the dead-end authentication process should the consumer attempts authentication again. This may help minimize the risk that the consumer may get around the authentication system 101 in the future as well.

Figure 9:
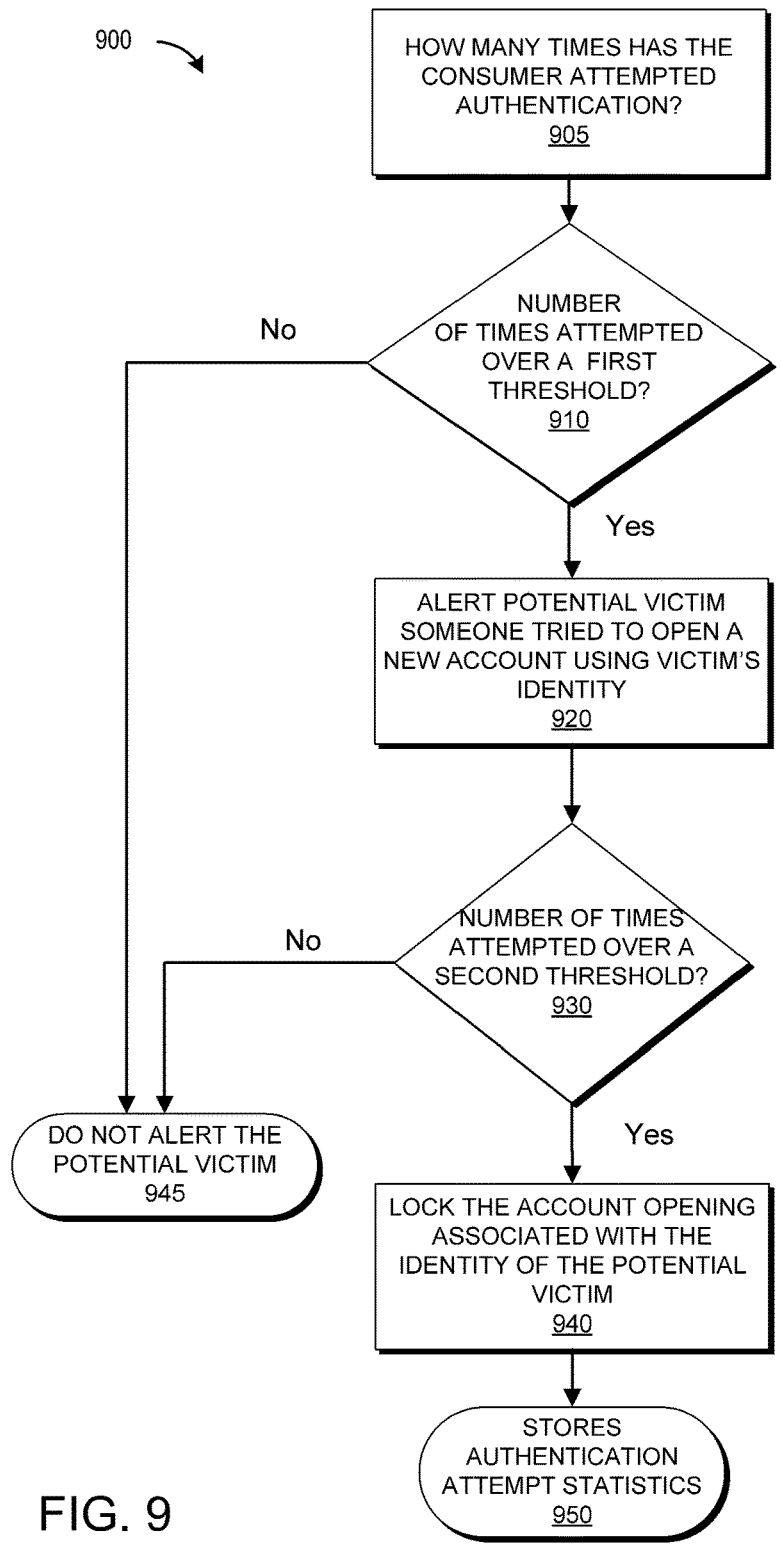
FIG. 9 is a flowchart that illustrates one embodiment of a method of alerting a consumer that potentially fraudulent authentication was attempted and storing information collected from the authentication session.

FIG. 9 is a flowchart that illustrates one embodiment of alerting a consumer that potentially fraudulent authentication was attempted and storing information collected from the authentication session. The method 900 starts at block 905, wherein the authentication system 101 determines how many times the consumer has attempted authentication. In some embodiments, instead of only determining a total amount of times attempted, the system may also determine the frequency of such attempts within a period of time.

The method 900 proceeds to decision block 910, wherein the authentication system 101 determines whether the number of times authentication has been attempted by the consumer exceeds a first threshold. If the answer to the question in decision block 910 is no, then the method 900 proceeds to block 945 and ends without alerting a potential victim of fraud because the number of attempts have not arisen to a level that is above the first threshold.

If the answer to the question in decision block 910 is yes, that is, the number of attempted authentications has exceeded the first threshold, then the method 900 proceeds to block 920, wherein the authentication system 101 sends an alert to the victim (e.g., the consumer whose identity is included in the attempted authentication) and let the victim know that someone has tried to open a new account using the victim's identity.

The method 900 then proceeds to decision block 930, wherein the authentication system 101 determines whether the number of times authentication has been attempted by the consumer exceeds a second threshold, which is higher than the first threshold. If the answer to the question in decision block 930 is no, then the method 900 proceeds to block 945 and ends without sending a second alert to a potential victim of fraud because the number of attempts have not arisen to a level that is above the second threshold.

However, if the answer to the question in decision block 910 is yes, that is, the number of attempted authentications has exceeded the second threshold, then the method 900 proceeds to block 940, wherein the authentication system 101 locks new account opening opportunities involved with identity of the potential fraud victim. Depending on the risk involved and the embodiment, the period of time that the victim's account is locked may vary. Once the victim's account is locked, no new account may be opened using the identity of the victim until the lock is released.

The method 900 then proceeds to block 950, wherein the authentication system 101 stores the statistics related to authentication attempts. The statistics may help adjust the first and second threshold used by the authentication system 101 in the future.

OTHER EMBODIMENTS

Although the foregoing systems and methods have been described in terms of certain embodiments, other embodiments will be apparent to those of ordinary skill in the art from the disclosure herein. Additionally, other combinations, omissions, substitutions and modifications will be apparent to the skilled artisan in view of the disclosure herein. While some embodiments of the inventions have been described, these embodiments have been presented by way of example only, and are not intended to limit the scope of the inventions. Indeed, the novel methods and systems described herein may be embodied in a variety of other forms without departing from the spirit thereof. Further, the disclosure herein of any particular feature, aspect, method, property, characteristic, quality, attribute, element, or the like in connection with an embodiment can be used in all other embodiments set forth herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

What is claimed is:

1. A system comprising:
a non-transitory computer-readable storage medium for a financial services server comprising computer-executable instructions that direct the financial services server to:
receive, from a consumer computing device via the Internet, a request to open a new financial account with a financial service provider;
receive, from a consumer computing device via the Internet, device identification information associated with the consumer computing device gathered through device identification information gathering code, wherein the device identification information includes one or more of:
device ID,
device location,
browser type,
browser time zone,
browser language settings,
proxy settings,
stated IP address,
real IP address,
current GPS location data; or
historical GPS location data; and
transmit, to an authentication server, a request to set authentication requirements for the consumer and information allowing the authentication server to communicate with the consumer computing device;
receive, from the authentication server, a determination of whether the consumer is authenticated; and
in response to the determination, transmit, to the financial service server, an indication of whether the consumer is authenticated, wherein the financial service server determines whether to open the new financial account for the consumer based on the transmitted indication; and
a non-transitory computer-readable storage medium for the authentication server comprises computer-executable instructions that direct the authentication server to:
receive, from the financial services server via the Internet, the request to set authentication requirements for the consumer in response to the request transmitted from the consumer computing device to open the new financial account and device identification information associated with the consumer computing device, wherein the identity of the consumer is unknown to the financial service provider;
derive one or more behaviors of the consumer based on at least the device identification information;
calculate a fraud risk of the consumer based at least on the one or more derived behaviors of the consumer, wherein respective derived behaviors indicative of potential fraud cause the fraud risk to increase and respective derived behaviors not indicative of potential fraud cause the fraud risk to decrease;
generate one or more first user interfaces for the consumer, wherein the one or more first user interfaces includes an authentication question set having one or more authentication question, the authentication question set based on the calculated fraud risk;
receive a first response from the one or more first user interfaces indicative of a consumer's response to at least a first authentication question of the authentication question set;
based at least on the consumer's response to at least a first authentication question and the associated device identification information, automatically and dynamically adjust the authentication question set by changing one or more of the authentication questions, removing one or more of the authentication questions, and/or adding an additional authentication question;
generate one or more second user interfaces for the consumer, wherein the one or more second user interfaces includes the adjusted authentication question set having at least a second authentication question;
receive a second response indicative of the consumer's response to at least the second authentication question of the adjusted authentication question set;
based at least on the first response, the second response, and the associated device identification information, determine whether the consumer is authenticated; and
transmit an indication of consumer authentication to the financial services server.

2. The system of claim 1, wherein to derive one or more behaviors includes identifying an anomaly between the device identification information and predetermined information in a profile associated with the consumer.

3. The system of claim 1, wherein the authentication question set is generated based on a level of difficulty corresponding to the fraud risk.

4. The system of claim 1, wherein the fraud risk is updated based on the first response from the one or more first user interfaces.

5. The system of claim 1, wherein the fraud risk comprises a risk score.

6. The system of claim 1, wherein the first response includes an incorrect response, and the adjusted authentication question set is determined based on the incorrect response.

7. The system of claim 1, wherein the first response includes an elapsed time to respond, and the adjusted authentication question set is determined based on the elapsed time to respond.

19

8. A computer-implemented authentication method comprising:
   receiving a request to open a new financial account with a financial service provider;
   receiving device identification information associated with a consumer computing device gathered through device identification information gathering code, wherein the device identification information includes one or more of:
   device ID,
   device location,
   browser type,
   browser time zone,
   browser language settings,
   proxy settings,
   stated IP address,
   real IP address,
   current GPS location data; or
   historical GPS location data;
   transmitting a request to set authentication requirements for a consumer and information allowing an authentication server to communicate with the consumer computing device;
   receiving a determination of whether the consumer is authenticated; and
   in response to the determination, transmitting an indication of whether the consumer is authenticated, wherein a financial service server determines whether to open the new financial account for the consumer based on the transmitted indication; and
   for a first authentication session:
      receiving the request to set authentication requirements for the consumer in response to the request transmitted from the consumer computing device to open the new financial account and device identification information associated with the consumer computing device, wherein an identity of the consumer is unknown to the financial service provider;
      deriving one or more behaviors of the consumer based on at least the device identification information;
      calculating a fraud risk of the consumer based at least on the one or more derived behaviors of the consumer, wherein respective derived behaviors indicative of potential fraud cause the fraud risk to increase and respective derived behaviors not indicative of potential fraud cause the fraud risk to decrease;
      generating one or more first user interfaces for the consumer, wherein the one or more user first interfaces includes an authentication question set, the authentication question set based on the calculated fraud risk;
      receiving a first response from the one or more first user interfaces indicative of a consumer's response to the authentication question set;
      based at least on the consumer's response to at least a first authentication question and the associated device identification information, automatically and dynamically adjusting the authentication question set by changing one or more of the authentication questions, removing one or more of the authentication questions, and/or adding an additional authentication question; and
      transmitting an indication of consumer authentication to the financial services server;
   for a second authentication session:

20 receiving, from the financial services server or another computing system, a second request to set authentication requirements for the consumer;
      based on at least the indication of consumer authentication, generating one or more second user interfaces for the consumer, wherein the one or more second user interfaces includes the adjusted authentication question set;
      receiving a second response to the adjusted authentication question set;
      based at least on the first response to the authentication question set, the second response, and the device identification information, determining whether the consumer is authenticated; and
      transmitting a second indication of consumer authentication to the financial services server.

9. The method of claim 8, wherein the one or more user interfaces for the consumer provides a false indication of the correctness of the consumer's response to the authentication question set.

10. The method of claim 8, wherein the one or more user interfaces for the consumer does not indicate whether the consumer's response to the authentication question set was correct.

11. The method of claim 8, wherein the behaviors of the consumer comprises one or more of: frequent attempts to open a new account, requesting a new account from more than one computing device, having a device IP address that matches a known IP addresses associated with a high risk of fraud, or submitting a password that matches a unique password known to be related to a high risk of fraud.

12. The method of claim 8, wherein the device identification information gathering code includes embedded instructions sent to the consumer computing device to collect the device identification information, and to process information collected from the embedded instructions.

13. The method of claim 8, further comprising:
   determining whether the fraud risk is above a threshold; and
   in response to the determination that the fraud risk is above a threshold, sending a request to the consumer computing device for further device identification information.

14. A computer-implemented authentication method comprising:
   receiving, from a financial services server via the Internet, a request to set authentication requirements for a consumer in response to a request transmitted from a consumer computing device to open a new financial account and device identification information associated with the consumer computing device, wherein the the identity of the consumer is unknown to the financial services server, wherein the device identification information includes one or more of:
   device ID,
   device location,
   browser type,
   browser time zone,
   browser language settings,
   proxy settings,
   stated IP address,
   real IP address,
   current GPS location data; or
   historical GPS location data;
   deriving one or more behaviors of the consumer based on at least the device identification information;

calculating a fraud risk of the consumer based at least on the one or more derived behaviors of the consumer, wherein respective derived behaviors indicative of potential fraud cause the fraud risk to increase and respective derived behaviors not indicative of potential fraud cause the fraud risk to decrease;

generating one or more first user interfaces for the consumer, wherein the one or more first user interfaces includes an authentication question set having one or more authentication questions, the authentication question set based on the calculated fraud risk;

receiving a first response from the one or more first user interfaces indicative of a consumer's response to at least a first authentication question of the authentication question set;

based at least on the consumer's response to at least a first authentication question and the associated device identification information, automatically and dynamically adjusting the authentication question set by changing one or more of the authentication questions, removing one or more of the authentication questions, and/or adding an additional authentication question;

generate one or more second user interfaces for the consumer, wherein the one or more second user interfaces includes the adjusted authentication question set having at least a second authentication question;

receive a second response indicative of the consumer's response to at least the second authentication question of the adjusted authentication question set;

based at least on the first response, the second response, and the device identification, determine whether the consumer is authenticated; and transmitting an indication of the consumer authentication to the financial services server.

15. The method of claim 14, wherein the authentication question set includes at least one trick question.

16. The method of claim 14, wherein to automatically and dynamically adjust the authentication question set includes adjusting the difficulty of at least one question in the authentication question set.

17. The method of claim 14, wherein to automatically and dynamically adjust the authentication question set includes adjusting the number of questions in the authentication question set.

18. The method of claim 14, wherein the one or more behaviors of the consumer includes at last one of: a total number of times authentication was requested for the consumer or a frequency at which authentication was requested for the consumer.

19. The method of claim 14, further comprising:
determining whether the fraud risk is higher than a threshold; and
in response to the determination that the fraud risk is higher than the threshold, transmitting an alert to the victim of the authentication fraud.

20. The method of claim 14, further comprising:
determining whether the fraud risk is higher than a threshold; and
in response to the determination that the fraud risk is higher than the threshold, performing a lock on an account associated with the victim of the authentication fraud.

21. The system of claim 1, wherein the system further comprises computer-executable instructions that direct the authentication server to:
compare, by the authentication server, location information of the consumer with location information from the device identification information, wherein to automatically and dynamically adjust the authentication question set is further based on the comparison of the location information.

* * * * *

UNITED STATES PATENT AND TRADEMARK OFFICE
CERTIFICATE OF CORRECTION

PATENT NO. : 10,169,761 B1
APPLICATION NO. : 15/459927
DATED : January 1, 2019
INVENTOR(S) : Michael Burger It is certified that error appears in the above-identified patent and that said Letters Patent is hereby corrected as shown below:

On the Title Page

Page 6, in Column 2, item (56), U.S. Patent Documents, Line 9, delete "Graft" and insert --Greff--.

Page 10, in Column 2, item (56), Other Publications, Line 10, delete "Erica" and insert --Erica,--.

In the Specification

Column 3, Line 32, delete "and or" and insert --and/or--.

Column 4, Line 57, delete "Mode1" and insert --Model--.

In the Claims

Column 20, Line 53, Claim 14, before "identity" delete "the".

Signed and Sealed this
Tenth Day of March, 2020

Andrei Iancu
*Director of the United States Patent and Trademark Office*